(12) United States Patent
Alkhorem et al.

(10) Patent No.: US 12,508,629 B2
(45) Date of Patent: Dec. 30, 2025

(54) MULTI-AGENT BASED SCRAP COLLECTION AND SEGREGATION ROBOTIC SYSTEM FOR WASTE MANAGEMENT ECOSYSTEM

(71) Applicants: Azan Hamad Alkhorem, Majmaah (SA); Sultan Ahmed Almalki, Najran (SA); Tami Abdulrahman Alghamdi, Al-Baha (SA); Sunil Kumar Sharma, Majmaah (SA); Abhishek Sharma, Jaipur (IN)

(72) Inventors: Azan Hamad Alkhorem, Majmaah (SA); Sultan Ahmed Almalki, Najran (SA); Tami Abdulrahman Alghamdi, Al-Baha (SA); Sunil Kumar Sharma, Majmaah (SA); Abhishek Sharma, Jaipur (IN)

( * ) Notice: Subject to any disclaimer, the term of this patent is extended or adjusted under 35 U.S.C. 154(b) by 0 days.

(21) Appl. No.: 18/955,903

(22) Filed: Nov. 21, 2024

(65) Prior Publication Data

US 2025/0083193 A1   Mar. 13, 2025

(51) Int. Cl.
| | | |
|---|---|---|
| *B07C 5/36* | (2006.01) | |
| *B25J 9/16* | (2006.01) | |
| *B25J 15/06* | (2006.01) | |

(52) U.S. Cl.
CPC ............ *B07C 5/362* (2013.01); *B25J 9/162* (2013.01); *B25J 9/1679* (2013.01); *B25J 15/0691* (2013.01); *B07C 2501/0054* (2013.01); *B07C 2501/0063* (2013.01)

(58) Field of Classification Search
CPC ............ B07C 5/362; B07C 2501/0054; B07C 2501/0063; B25J 9/162; B25J 9/1679; B25J 15/0691; B25J 5/007
See application file for complete search history.

(56) References Cited

FOREIGN PATENT DOCUMENTS

CN          118701196 A   *  9/2024   ............... B25J 9/16

* cited by examiner

*Primary Examiner* — Jacob S. Scott
*Assistant Examiner* — Miraj T. Patel
(74) *Attorney, Agent, or Firm* — Maschoff Brennan

(57) ABSTRACT

The present invention discloses a multi-agent robotic system for scrap collection and segregation is disclosed, featuring a foldable chassis with dynamic mechanical assemblies and integrated intelligence for precise waste management. The system includes articulated robotic arms equipped with grippers to collect and categorize materials, powered by dual-piston hydraulic actuators that drive telescopic folding segments with positional encoders for synchronized deployment. A control interface module, mounted on shock-dampening supports, comprises a multi-core CPU to process real-time data from sensors and actuators, ensuring precise operations. A wireless communication module enables encrypted coordination between multiple systems in the ecosystem. The mobility assembly integrates omnidirectional wheels with foldable axles and gyroscopic stabilization for seamless movement. A scrap segregation module incorporates a dynamic bin carousel with detachable bins and automated locking mechanisms for categorized deposition.

17 Claims, 13 Drawing Sheets

MULTI-AGENT BASED SCRAP COLLECTION AND SEGREGATION ROBOTIC SYSTEM FOR WASTE MANAGEMENT ECOSYSTEM

FIELD OF THE INVENTION

The present invention relates to the field of robotics, specifically to a multi-agent based scrap collection and segregation robotic system for waste management ecosystem. In more particular manner the present invention relates to a scrap collection and segregation device that utilizes a network of sensors, actuators, and cameras to detect, collect, and segregate various types of waste materials

BACKGROUND

Effective Waste management is a critical aspect of modern society, necessitating efficient methods for collection, segregation, and processing of diverse waste materials. Traditional waste management practices have relied heavily on manual labor and rudimentary sorting techniques, leading to inefficiencies, environmental pollution, and resource wastage. Conventional solutions typically involve manual sorting at landfill sites or rudimentary mechanical sorting systems, both of which suffer from significant drawbacks.

Manual sorting, while inexpensive in terms of initial investment, is labor-intensive and time-consuming. Human workers are required to physically segregate different types of waste, often exposing them to hazardous materials and compromising their health and safety. Moreover, manual sorting is prone to errors and inconsistencies, leading to improper segregation and contamination of recyclable materials. Additionally, the scalability of manual sorting operations is limited, making it impractical for handling large volumes of waste efficiently.

Mechanical sorting systems, on the other hand, aim to automate the segregation process using conveyor belts, magnets, and other mechanical components. While these systems offer improved efficiency compared to manual sorting, they are still limited in their ability to accurately segregate diverse waste materials. Mechanical systems struggle with complex sorting tasks, such as separating different types of plastics or identifying and extracting contaminants from recyclable materials. Furthermore, mechanical sorting systems require significant maintenance and operational costs, making them economically unviable for many waste management facilities.

In recent years, there has been growing interest in deploying robotic solutions for waste management, leveraging advancements in robotics, artificial intelligence, and sensor technologies. These robotic systems offer the promise of enhanced efficiency, accuracy, and scalability compared to traditional waste management methods. However, existing robotic solutions still face several challenges and limitations that hinder their widespread adoption and effectiveness.

One common drawback of existing robotic waste management systems is their limited autonomy and adaptability. Many robotic systems rely on pre-programmed routines and static techniques, which restrict their ability to adapt to dynamic environments and unforeseen obstacles. These systems often struggle to handle variations in waste composition, terrain, and environmental conditions, leading to inefficiencies and operational delays. Moreover, the lack of real-time decision-making capabilities limits the autonomy of robotic systems, requiring constant human supervision and intervention.

Another challenge facing existing robotic waste management systems is their reliance on single-purpose designs and functionalities. Many robotic systems are specialized for specific tasks, such as sorting recyclables or collecting trash, limiting their versatility and scalability. This fragmented approach results in the proliferation of disparate robotic solutions, each addressing a narrow subset of waste management challenges. As a result, waste management facilities may require multiple robotic systems to handle different aspects of the waste management process, increasing complexity and operational overhead.

Furthermore, existing robotic waste management systems often struggle with robustness and reliability in real-world environments. The harsh and unpredictable nature of waste management facilities poses significant challenges for robotic systems, including exposure to dust, moisture, and abrasive materials. These environmental factors can degrade the performance of sensors, actuators, and other critical components, leading to increased maintenance requirements and downtime. Additionally, the complexity of waste sorting tasks, such as identifying and separating mixed materials or detecting contaminants, requires advanced sensor technologies and intelligent techniques, which may not always perform reliably in practice.

While existing waste management solutions have made significant strides in automating and improving the efficiency of waste collection and segregation, they still suffer from several limitations and drawbacks. Manual sorting methods are labor-intensive, error-prone, and lack scalability, while mechanical sorting systems struggle with accuracy, adaptability, and maintenance costs. Robotic waste management systems offer promise for addressing these challenges but face hurdles related to autonomy, versatility, and robustness. Addressing these limitations will be crucial for realizing the full potential of robotic technologies in revolutionizing waste management practices and achieving sustainability goals.

SUMMARY OF THE INVENTION

The present invention relates to a mutli-agent based scrap collection and segregation robotic system for waste management ecosystem. The Multi-Agent Based Scrap Collection and Segregation Robotic Device is a cutting-edge solution addressing the urgent need for efficient waste management in urban areas. It employs advanced technologies like sensors, actuators, and cameras to autonomously detect, collect, and segregate various types of waste materials, overcoming the limitations of traditional methods. It's Hardware-in-loop and Software-in-loop technologies ensure precise control and real-time decision-making, enhancing sorting efficiency. Energy sustainability is a priority, with a hybrid power system and multi-grid regulators for uninterrupted operation. The device's versatility allows it to function independently or in coordination with other units, seamlessly integrating into existing waste management systems for improved scalability and environmental impact. Multi-Agent Based Scrap Collection and Segregation Robotic System refers to a system that employs multiple autonomous or semi-autonomous robotic units (referred to as "agents") working collaboratively to perform tasks related to scrap collection and segregation. Each agent is a robotic unit equipped with sensors, actuators, and a control module, designed to execute specific functions such as identifying, collecting, transporting, and segregating waste materials.

The present invention relates to a multi-agent-based scrap collection and segregation robotic system for a waste management ecosystem. The system comprises: a chassis, comprising a rigid central frame formed of corrosion-resistant alloy with integrated weight-distribution support beams to prevent structural deformation during operation, mounting brackets to securely attach actuators, robotic arms, and sensor modules, and a reinforced compartment housing for protecting the power management unit and processing unit against mechanical impacts; a plurality of foldable actuators, wherein each actuator comprises a compact dual-piston hydraulic system configured to generate precise linear or rotational motion; said actuators are operatively connected to a telescopic folding mechanism comprising interlocking segments made of lightweight composite material, enabling the robotic system to transition between a compact transportable state and an operational state; a sensor array module, wherein the array module comprises an infrared proximity sensor, a capacitive touch sensor, and an industrial-grade hyperspectral imaging sensor mounted on a swiveling head attached to the chassis, and wherein the hyperspectral imaging sensor is configured to identify material composition and contaminants by analyzing reflected light spectra, and wherein the capacitive touch sensor is embedded within the gripper unit to detect and classify surface textures of scrap material; a robotic arm assembly, mounted on a precision-machined rotary base fixed to the chassis, comprising multiple articulating segments, each segment containing a hollow-core shaft for housing internal wiring and fluid conduits, and a harmonic drive system for smooth and high-torque angular motion, and an adjustable gripper unit, wherein the gripper unit comprises dual opposing jaws with serrated edges and a central vacuum suction pad for handling irregularly shaped or fragile materials, the jaws are driven by miniature servo motors with load-bearing torque sensors to optimize gripping force, and the vacuum suction pad is connected to an onboard pneumatic pump housed within the chassis; a scrap segregation module, comprising a dynamic bin carousel, wherein the carousel comprises a circular platform fabricated from abrasion-resistant polymer, the platform is divided into radial slots designed to hold detachable bins, each bin equipped with magnetic tags for automated bin identification, and a bin locking mechanism, comprising a spring-loaded latch and an electronic solenoid actuator, configured to engage and release bins based on control signals from the processing unit; a mobility assembly, comprising a pair of omnidirectional wheels, each wheel containing integrated roller mechanisms for seamless lateral and rotational movement, foldable axles, wherein the axles are made of high-tensile steel tubes with hinge joints actuated by electric motors for folding the wheels into the chassis during transport, and a gyroscopic stabilization unit, comprising a triple-axis gyroscope mounted on shock-absorbing mounts, configured to dynamically adjust the robot's center of gravity during operation; a foldable frame mechanism, wherein the mechanism comprises hinged struts fabricated from lightweight aluminum alloy, each strut is connected to linear actuators equipped with positional encoders for synchronized folding and unfolding of the frame; a power management unit, comprising: a modular lithium-ion battery pack enclosed within a thermally insulated casing to ensure optimal performance in varying environmental conditions; and a control interface module, comprising a central processing unit, mounted on shock-dampening mounts within the chassis, configured with a multi-core architecture to execute real-time control techniques for actuators and sensor integration, and a wireless communication module, comprising a dual-band transceiver and an encrypted communication protocol for coordinating with other robotic systems in the waste management ecosystem.

The present invention also seeks to provide a method for operating a multi-agent-based scrap collection and segregation robotic system for a waste management ecosystem. The method comprises: initiating movement of the robotic system using a mobility assembly comprising omnidirectional wheels and foldable axles, wherein gyroscopic sensors detect terrain irregularities and adjust wheel speed and axle position to maintain stability; detecting target scrap material using a sensor array module, wherein hyperspectral imaging and proximity sensors identify material composition and spatial location relative to the system; aligning the robotic arm assembly, wherein positional data from the sensor array triggers the rotation of the arm's pivoting base via a harmonic drive system, and articulating segments of the robotic arm adjust their angles based on torque feedback to position the gripper unit precisely over the target material; gripping the target material, wherein the gripper unit activates its serrated jaws and vacuum suction pad based on the material's properties detected by capacitive sensors, and the gripping force is dynamically adjusted using embedded load sensors to ensure secure handling of the material; transporting the gripped material to the designated bin, wherein the robotic arm rotates and extends to position the material over a dynamic bin carousel, and the bin is identified by an RFID scanner embedded within the carousel platform; and depositing the material, wherein the gripper unit releases the material into the bin upon receiving confirmation from proximity sensors detecting bin alignment, and the carousel rotates to prepare for the next segregation task.

An objective of the present disclosure is to provide a Multi-Agent Based Scrap Collection and Segregation Robotic Device for waste management applications.

An objective of the present disclosure is to enhance waste management efficiency in urban environments by automating the collection and segregation process using advanced technologies.

Another objective of the present disclosure is to reduce the carbon footprint of waste management operations through the integration of a hybrid power system and energy optimization techniques.

Another objective of the present disclosure is to improve sorting accuracy and effectiveness through Hardware-in-loop and Software-in-loop technologies for precise control and real-time decision-making.

Another objective of the present disclosure is to promote environmental conservation by enabling seamless integration into existing waste management ecosystems and contributing to overall sustainability efforts.

Yet, another objective of the present disclosure is to ensure operational reliability in challenging conditions by utilizing multi-grid power regulators and enabling multi-agent based operations for enhanced scalability and adaptability.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein.

Figure 1:
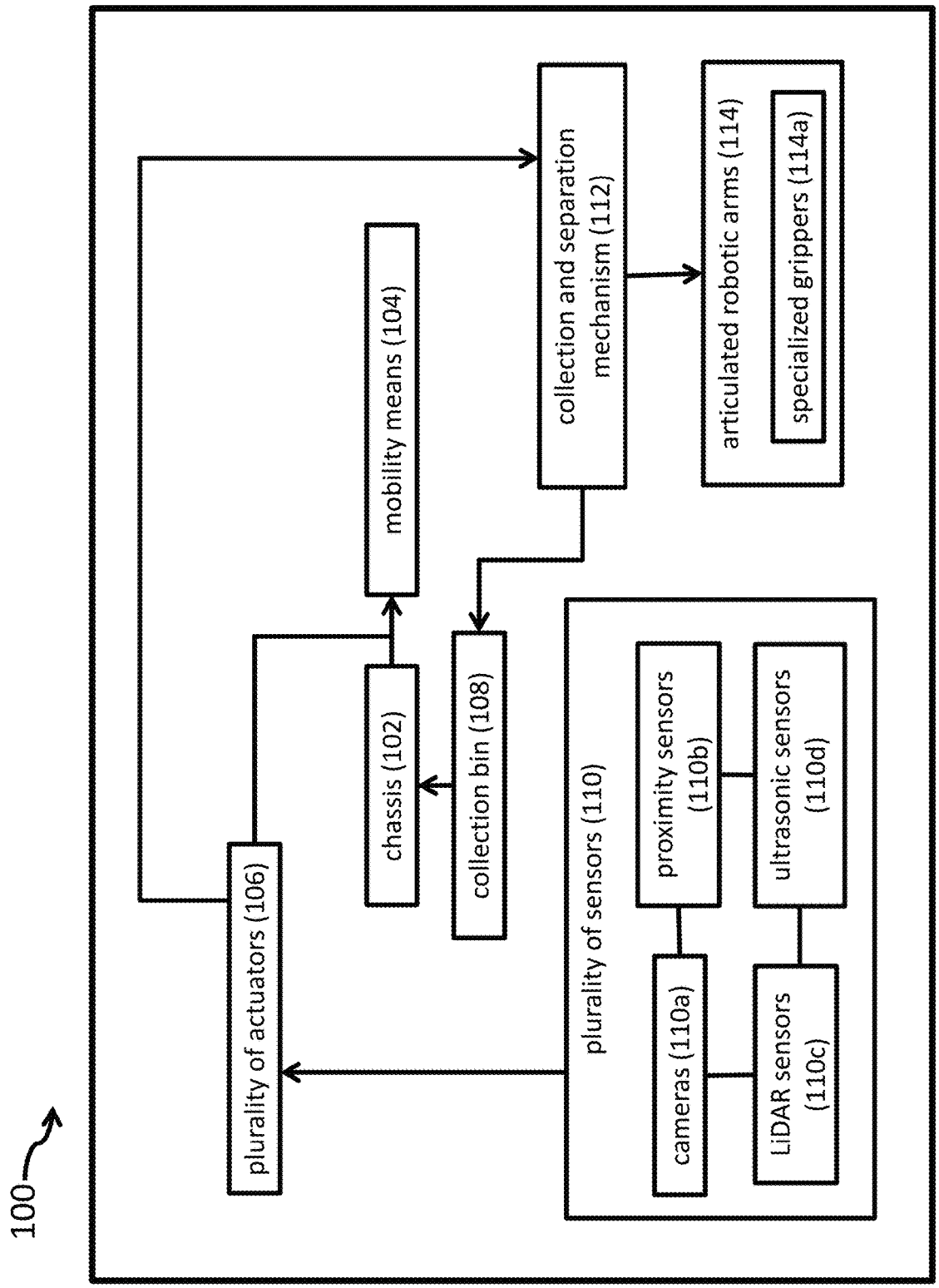
FIG. 1 illustrates a block diagram of a robotic waste management system in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

FIG. 1 illustrates a block diagram of a robotic waste management system (100) in accordance with an embodiment of the present disclosure.

Referring to FIG. 1, the system (100) includes a chassis (102) with mobility means (104) for traversing diverse terrains; a plurality of actuators (106) configured to execute precise mechanical movements; a collection bin (108) with compartments for storing segregated waste materials; a plurality of sensors (110) including cameras (110a), proximity sensors (110b), and LiDAR sensors (110c) for environmental perception; a collection and separation mechanism (112) comprising articulated robotic arms (114) equipped with specialized grippers (114a), wherein said system (100) is configured to identify, collect, and segregate different types of waste materials into metal, plastic, organic waste, and general waste categories.

In an embodiment, said actuators (106) include electric motors, hydraulic cylinders, or pneumatic actuators for manipulating waste materials.

In an embodiment, cameras (110a) are configured to capture high-resolution images of the surrounding environment, and wherein object recognition techniques are employed to classify waste materials based on visual features.

In an embodiment, said sensors (110) further include ultrasonic sensors (110d) for distance measurement and obstacle avoidance.

In an embodiment, said collection and separation mechanism (112) is programmed to perform precise movements and actions for picking up, transporting, and depositing waste materials into the designated compartments within the collection bin (108).

Figure 2:
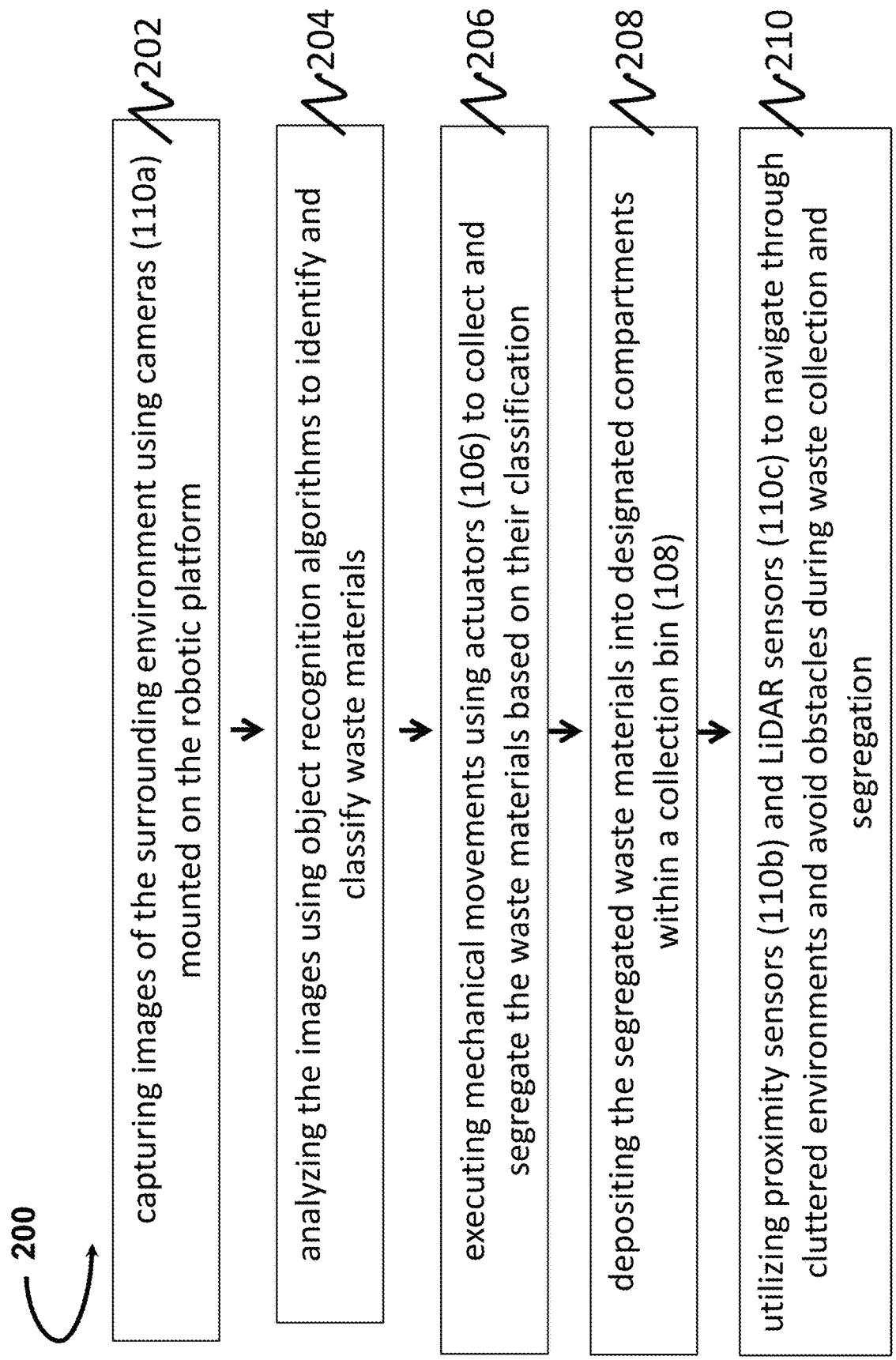
FIG. 2 illustrates a flow chart of a method for segregating waste materials using a robotic waste management system in accordance with an embodiment of the present disclosure.

FIG. 2 illustrates a flow chart of a method (200) for segregating waste materials using a robotic waste management system in accordance with an embodiment of the present disclosure.

Referring to FIG. 2, the method (200) includes pluralities of steps are given below.

At step (202), the method (200) includes capturing images of the surrounding environment using cameras (110a) mounted on the robotic platform.

At step (204), the method (200) includes analyzing the images using object recognition techniques to identify and classify waste materials.

At step (206), the method (200) includes executing mechanical movements using actuators (106) to collect and segregate the waste materials based on their classification.

At step (208), the method (200) includes depositing the segregated waste materials into designated compartments within a collection bin (108).

In an embodiment, the waste materials are classified into metal, plastic, organic waste, and general waste categories based on visual features extracted from the captured images.

In an embodiment, the method (200) further comprises the step (210) of utilizing proximity sensors (110b) and LiDAR sensors (110c) to navigate through cluttered environments and avoid obstacles during waste collection and segregation.

In an embodiment, the arms collection and separation mechanism (112) employs magnetic or electromagnetic sorting techniques to separate ferrous and non-ferrous metals from other materials.

In an embodiment, the arms collection and separation mechanism (112) employs optical sorting techniques to separate different types of plastics based on their optical properties such as color and transparency.

The Multi-Agent Based Scrap Collection and Segregation Robotic system addresses the pressing need for efficient waste management solutions in modern urban environments. With the ever-increasing volume of waste generated, conventional waste management practices fall short in effectively segregating and processing diverse types of materials. The present invention overcomes these limitations by leveraging cutting-edge technologies to automate the collection and segregation process.

Figure 3:
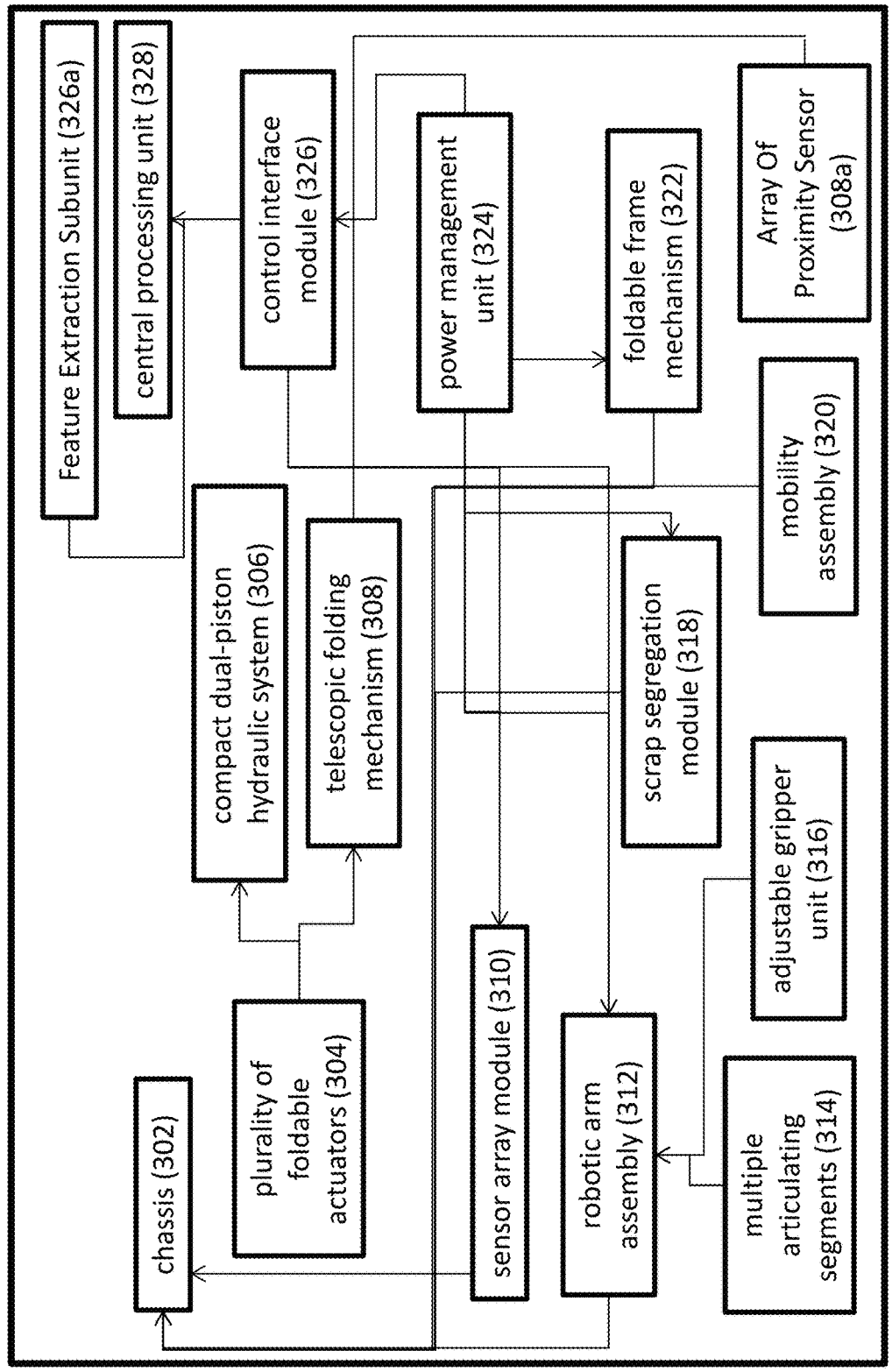
FIG. 3 illustrates a block diagram of a multi-agent-based scrap collection and segregation robotic system for a waste management ecosystem in accordance with an embodiment of the present disclosure.

FIG. 3 illustrates a block diagram of a multi-agent-based scrap collection and segregation robotic system (300) for a waste management ecosystem in accordance with an embodiment of the present disclosure.

Referring to FIG. 3, the system (300) includes: a chassis (302), comprising: a rigid central frame (302a) formed of corrosion-resistant alloy with integrated weight-distribution support beams (302b) to prevent structural deformation during operation; mounting brackets (302c) to securely attach actuators, robotic arms, and sensor modules; and a reinforced compartment housing (302d) for protecting the power management unit and central processing unit (328) against mechanical impacts. The system (300) further comprises a plurality of foldable actuators (304), wherein each actuator comprises a compact dual-piston hydraulic system (306) configured to generate precise linear or rotational motion; said actuators (304) are operatively connected to a telescopic folding mechanism (308) comprising interlocking segments (304a) made of lightweight composite material, enabling the robotic system (300) to transition between a compact transportable state and an operational state; and a sensor array module (310), wherein the array module comprises an infrared proximity sensor (310a), a capacitive touch sensor (310b), and an industrial-grade hyperspectral imaging sensor (310c) mounted on a swiveling head attached to the chassis (302), and wherein the hyperspectral imaging sensor (310c) is configured to identify material composition and contaminants by analyzing reflected light spectra, and wherein the capacitive touch sensor (310b) is embedded within the gripper unit to detect and classify surface textures of scrap material. The system (300) further comprises a robotic arm assembly (312), mounted on a precision-machined rotary base (312a) fixed to the chassis (302), comprising: multiple articulating segments (314), each segment containing: a hollow-core shaft (314a) for housing internal wiring (314c) and fluid conduits (314d), and a harmonic drive system (314b) for smooth and high-torque angular motion; and an adjustable gripper unit (316), wherein the gripper unit (316) comprises dual opposing jaws (316a) with serrated edges and a central vacuum suction pad (316b) for handling irregularly shaped or fragile materials; the jaws are driven by miniature servo motors (316c) with load-bearing torque sensors (316d) to optimize gripping force; and the vacuum suction pad is connected to an onboard pneumatic pump (316e) housed within the chassis. The system (300) further includes a scrap segregation module (318), comprising: a dynamic bin carousel (318a), wherein the carousel comprises a circular platform (318b) fabricated from abrasion-resistant polymer, the platform is divided into radial slots (318c) designed to hold detachable bins (318d), each bin equipped with magnetic tags (318e) for automated bin identification; and a bin locking mechanism (318f), comprising a spring-loaded latch (318g) and an electronic solenoid actuator (318h), configured to engage and release bins based on control signals from the processing unit. The system (300) further includes a mobility assembly (320), comprising: a pair of omnidirectional wheels (320a), each wheel containing integrated roller mechanisms (320b) for seamless lateral and rotational movement; foldable axles (320c), wherein the axles are made of high-tensile steel tubes (320d) with hinge joints (320e) actuated by electric motors (320f) for folding the wheels into the chassis during transport; and a gyroscopic stabilization unit (320g), comprising a triple-axis gyroscope (320h) mounted on shock-absorbing mounts (320i), configured to dynamically adjust the robot's center of gravity during operation. The system (300) further includes a foldable frame mechanism (322), wherein the mechanism comprises hinged struts (322a) fabricated from lightweight aluminum alloy, and each strut is connected to linear actuators (322b) equipped with positional encoders for synchronized folding and unfolding of the frame. The system (300) further includes a power management unit (324), comprising: a modular lithium-ion battery pack (324a) enclosed within a thermally insulated casing (324b) to ensure optimal performance in varying environmental conditions; and a control interface module (326), comprising a central processing unit (328), mounted on shock-dampening mounts (326a) within the chassis, configured with a multi-core architecture to execute real-time control techniques for actuators and sensor integration, and a wireless communication module (326b), comprising a dual-band transceiver (326c) and an encrypted communication protocol for coordinating with other robotic systems in the waste management ecosystem.

In an embodiment, each foldable actuator (304) further comprises: a dual-piston hydraulic system (306), wherein each piston (306c) is constructed from high-strength stainless steel with a micro-channel surface pattern to enhance fluid flow efficiency and reduce hydraulic lag, said pistons are housed within a sealed cylindrical chamber (306d) lined with nitrile-based elastomer to minimize wear during high-pressure operation, and wherein the micro-valve assemblies (306e) include precision-machined orifices (306f) with a diameter tolerance of ±0.01 mm to ensure uniform pressure distribution for synchronized motion; and a telescopic folding mechanism (308), wherein: the interlocking segments are fabricated from carbon-fiber-reinforced polymer with embedded strain gauges to monitor real-time structural stress during deployment; the internal locking notches are machined at an angle of 45 degrees to ensure maximum interlock force under dynamic load conditions, and wherein each segment is equipped with an integrated linear displacement sensor connected to the control interface for precise positional feedback during folding and unfolding operations.

In an embodiment, each foldable actuator (304) includes a dual-piston hydraulic system (306) configured such that the primary piston (306a) generates an initial linear motion, which in turn triggers a secondary piston (306b) through a synchronized hydraulic relay valve (306c), said relay valve (306c) directing fluid to extend or contract interlocking telescopic segments, and wherein the telescopic segments are sequentially deployed, with an integrated positional encoder detecting the extension state of each segment and transmitting signals to the control interface, enabling precise adjustment of the actuator's position during transition between the folded and operational states.

The actuator's primary piston generates an initial linear motion by pressurizing hydraulic fluid within its chamber. This motion is mechanically transmitted to a secondary piston via a synchronized hydraulic relay valve. The relay valve is equipped with a flow-control orifice that modulates the rate and direction of fluid flow, ensuring smooth and coordinated movement between the pistons.

For example, when the actuator receives a command to extend the telescopic segments, the control interface signals the hydraulic relay valve to open a forward flow channel. This action directs pressurized fluid to the secondary piston, causing it to extend in synchronization with the primary piston. The relay valve's synchronized control prevents uneven motion, maintaining structural integrity across the telescopic segments.

The telescopic segments are connected through precision-engineered interlocking joints with internal sliding interfaces. The sequential deployment is initiated when the hydraulic system extends the segments in a controlled order. This sequence is managed by positional encoders integrated into each segment. These encoders measure the displacement of each segment relative to its previous state and transmit the data to the control interface module.

The interlocking design ensures that the segments deploy without jamming or misalignment. For instance, the control interface receives positional feedback from the encoders, calculates the exact extension state of each segment, and dynamically adjusts the hydraulic pressure to ensure consistent deployment. If the encoder detects an incomplete extension due to an obstruction, the control interface signals the hydraulic system to pause, allowing the obstruction to be addressed.

Each telescopic segment is equipped with a high-precision positional encoder that continuously monitors its state of extension. The encoder uses optical or magnetic sensing technology to detect linear displacement with sub-millimeter accuracy. For example, a magnetic strip embedded along the length of each segment interacts with a Hall-effect sensor in the adjacent segment to provide real-time positional data.

Figure 6:
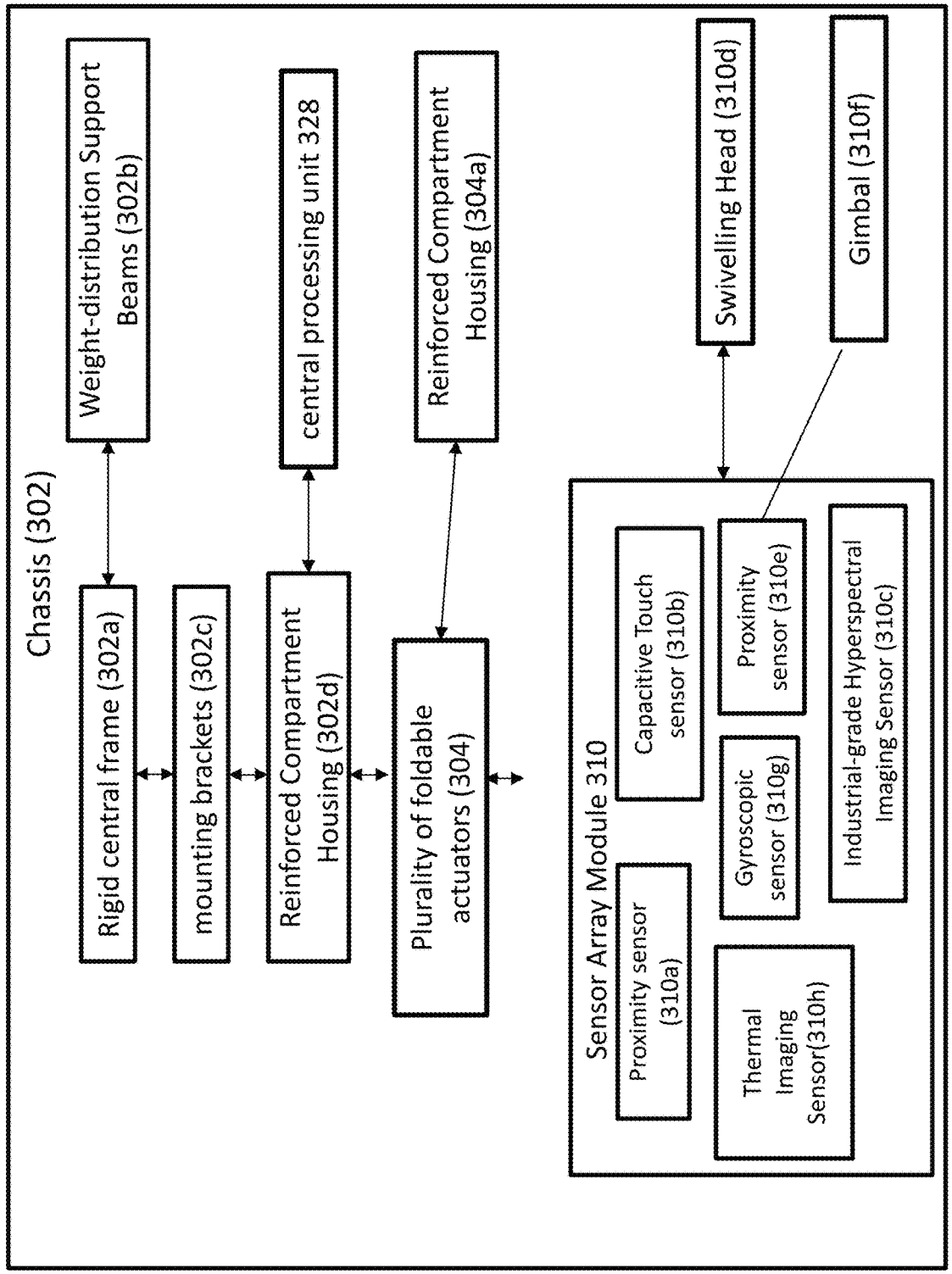
FIG. 6 illustrates a block diagram for a chassis of the robotic waste management system in accordance with an embodiment of the present disclosure.
Figure 7:
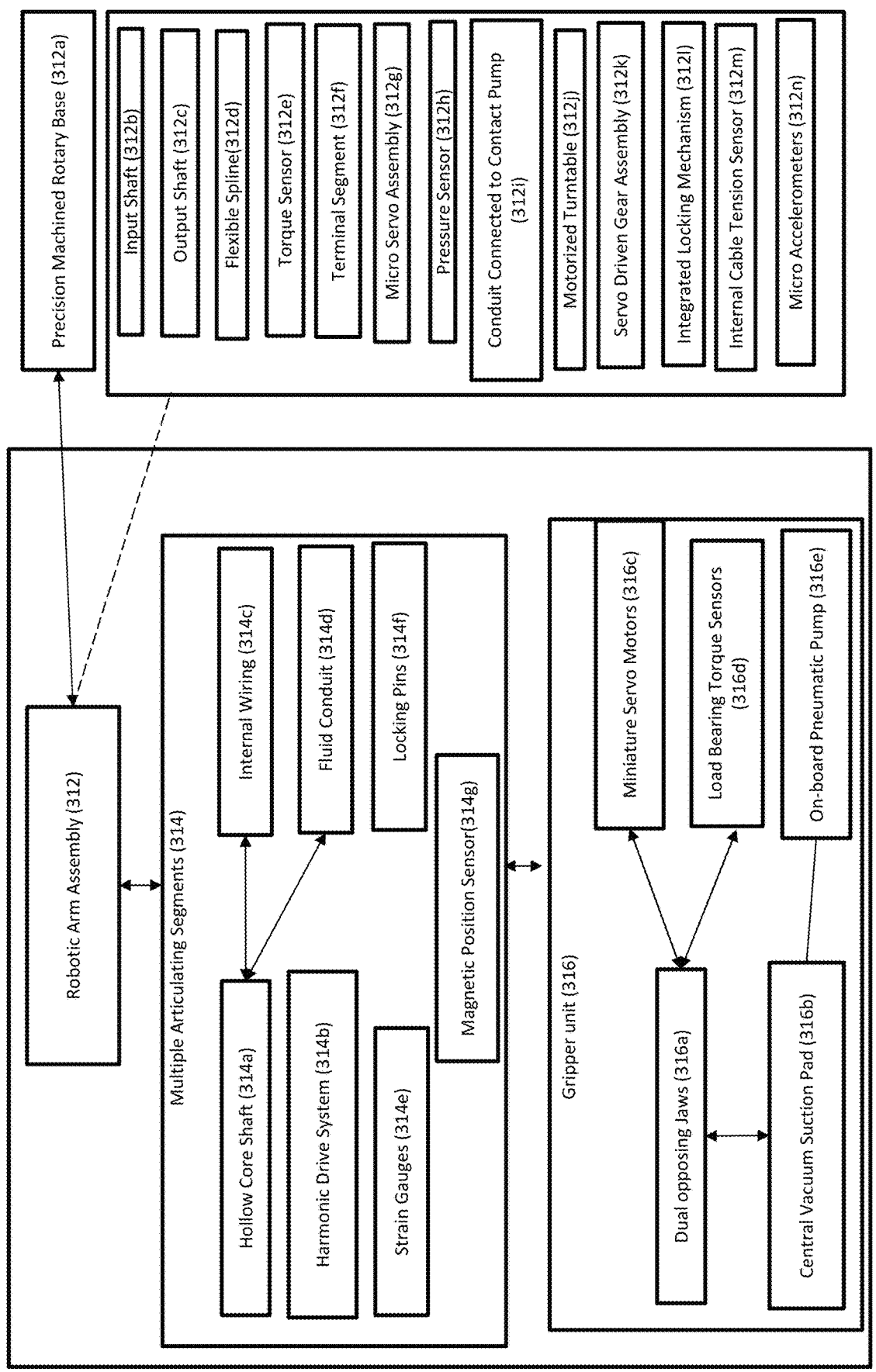
FIG. 7 illustrates a block diagram for a robotic arm assembly of the robotic waste management system in accordance with an embodiment of the present disclosure.
Figure 8:
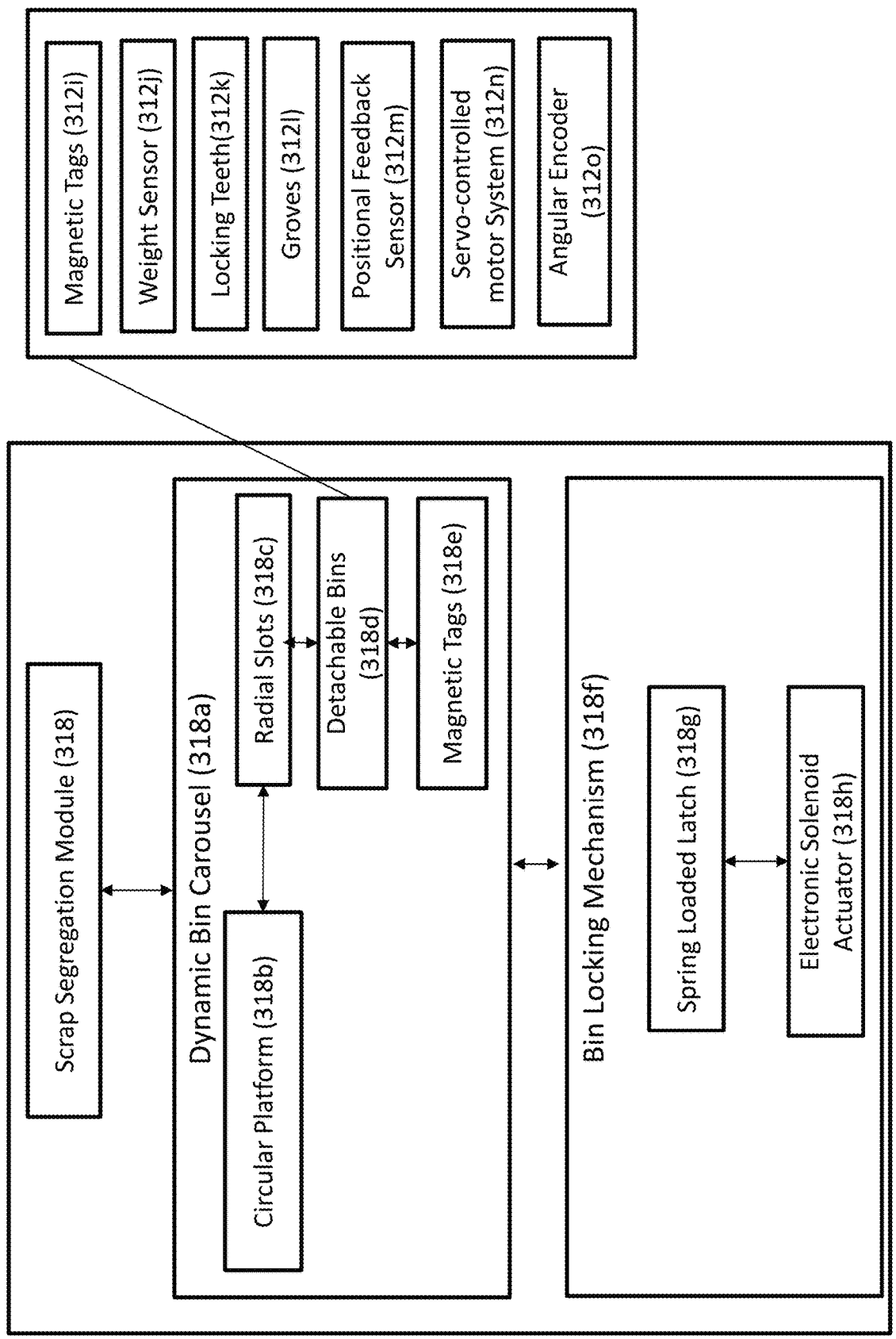
FIG. 8 illustrates a block diagram for a scrap segregation module of the robotic waste management system in accordance with an embodiment of the present disclosure.
Figure 9:
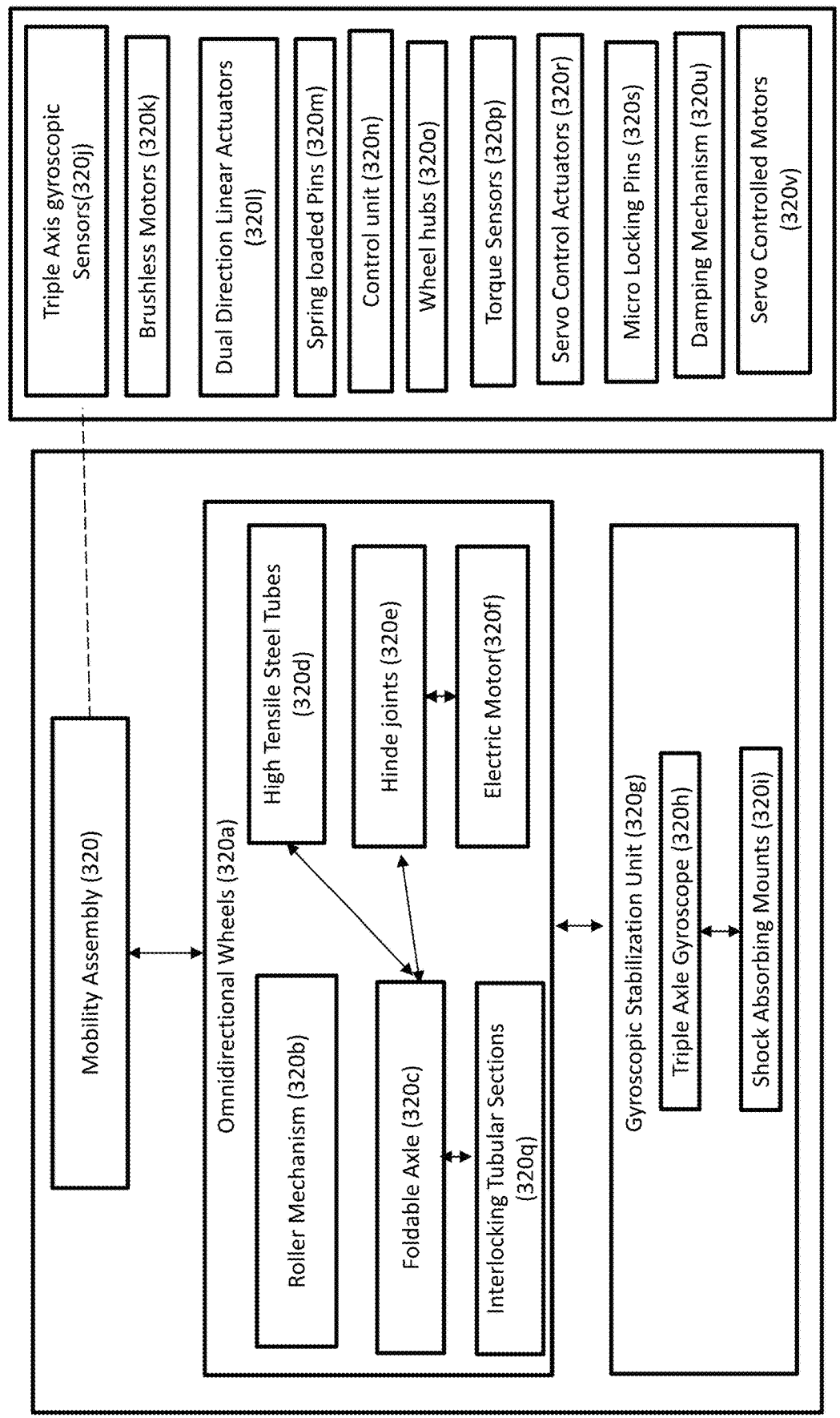
FIG. 9 illustrates a block diagram for a mobility assembly of the robotic waste management system in accordance with an embodiment of the present disclosure.
Figure 10:
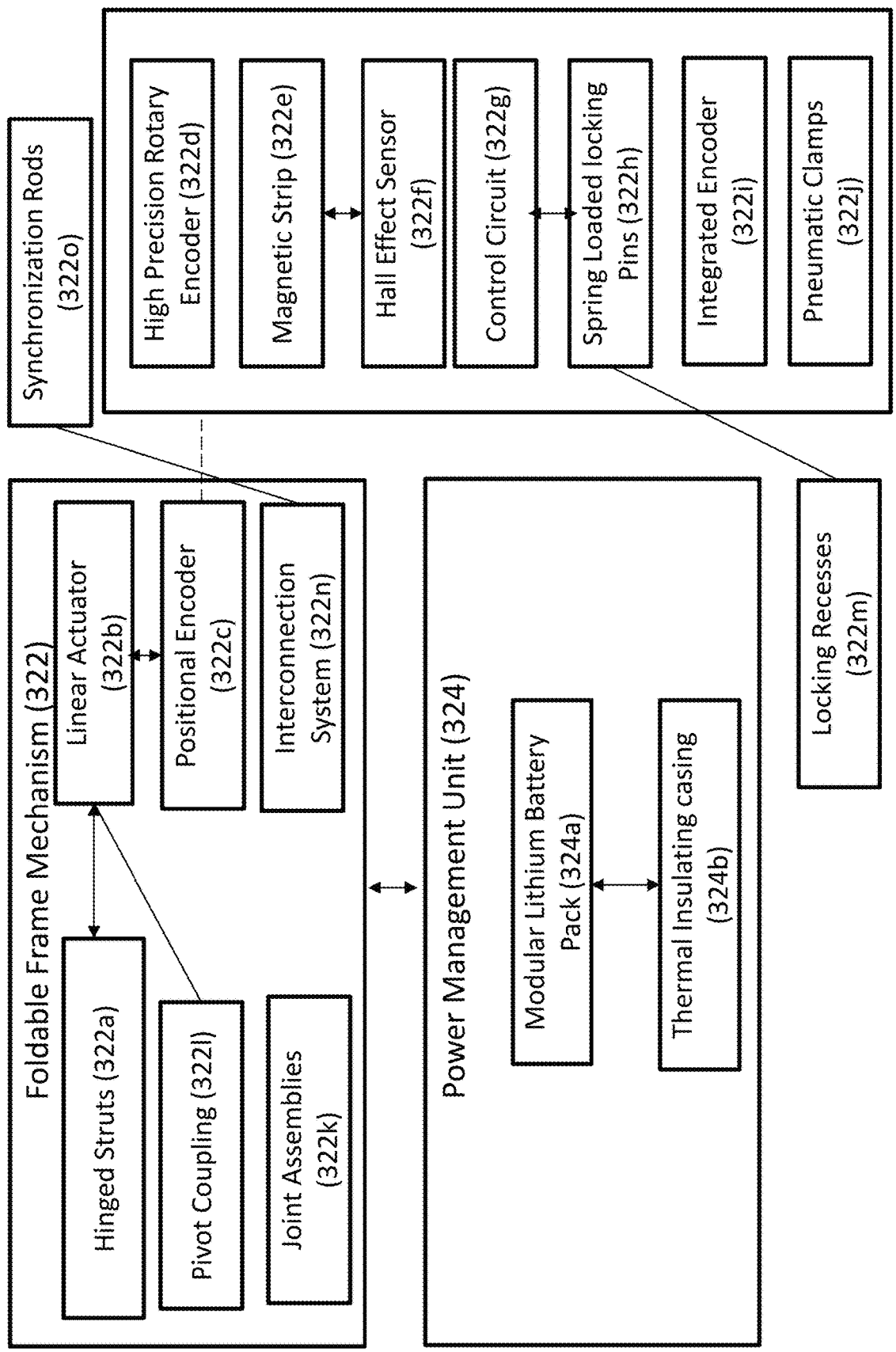
FIG. 10 illustrates a block diagram for a foldable frame mechanism and power management unit in accordance with an embodiment of the present disclosure.
Figure 11:
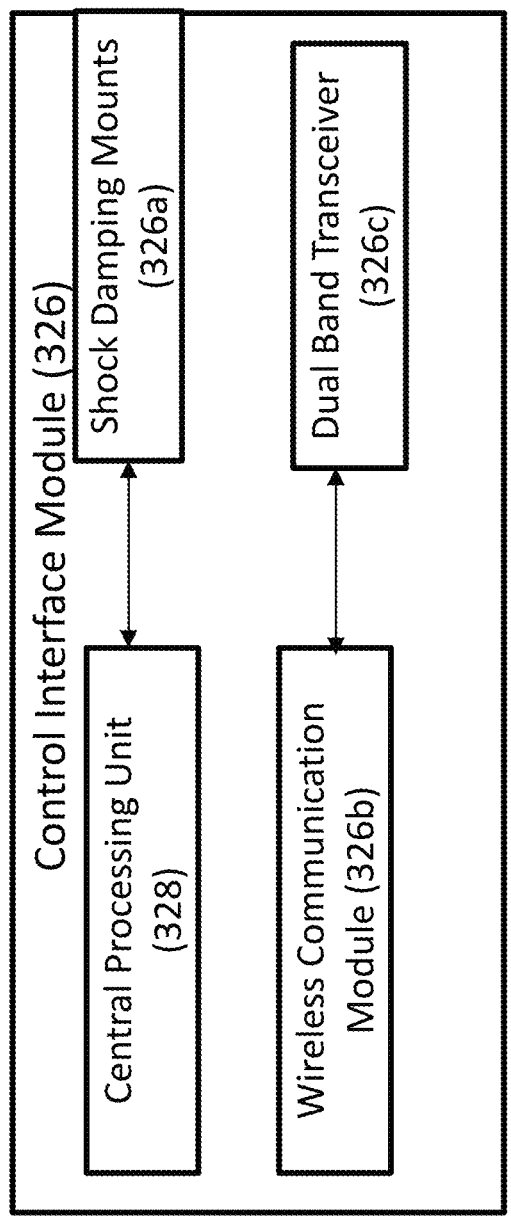
FIG. 11 illustrates a block diagram for a control interface module of the robotic waste management system in accordance with an embodiment of the present disclosure.
Figure 12:
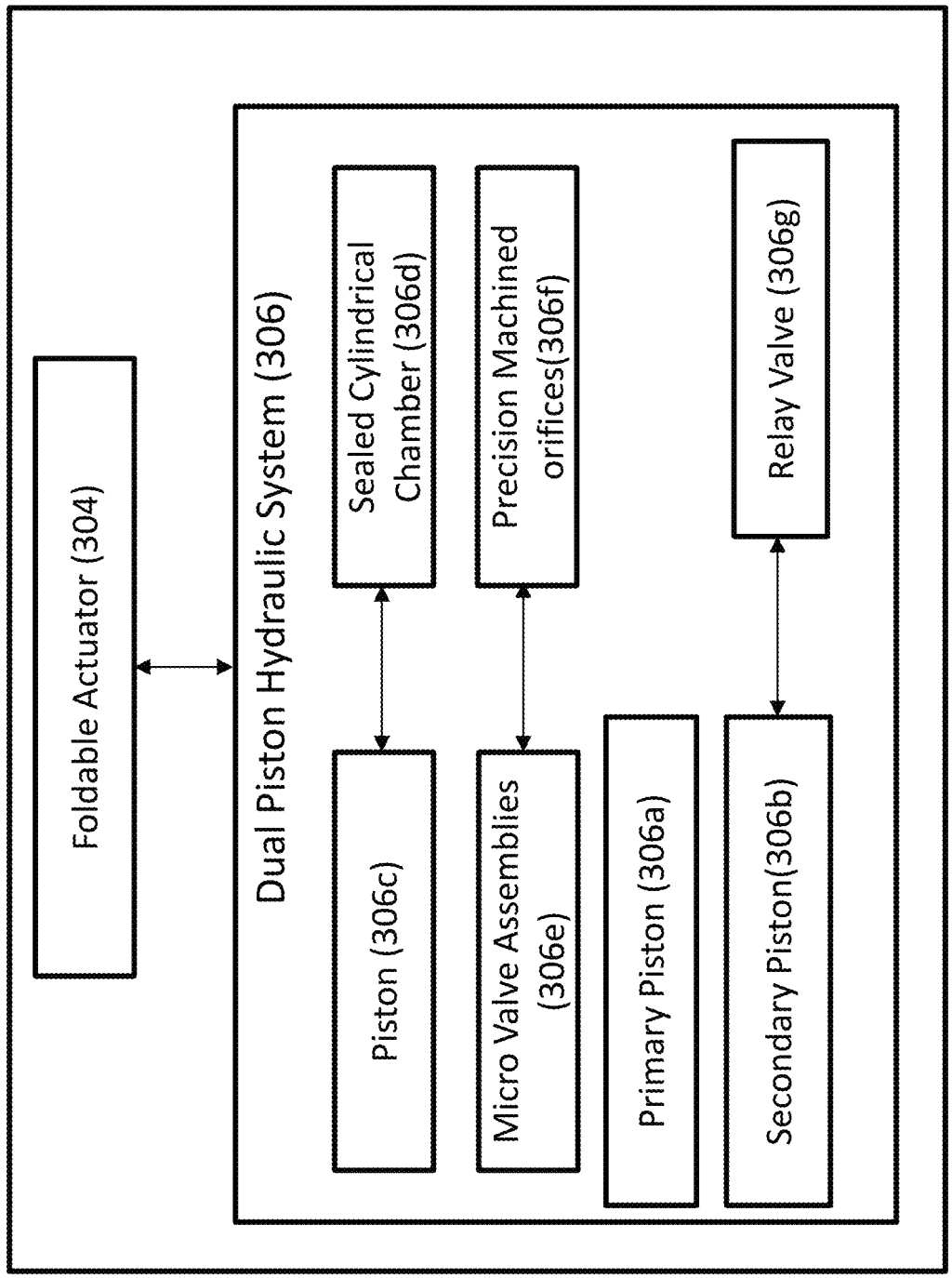
FIG. 12 illustrates a block diagram for a foldable actuator with a dual piston hydraulic system of the robotic waste management system in accordance with an embodiment of the present disclosure.

FIG. 6 illustrates a block diagram for a chassis of the robotic waste management system in accordance with an embodiment of the present disclosure. FIG. 7 illustrates a block diagram for a robotic arm assembly of the robotic waste management system in accordance with an embodiment of the present disclosure. FIG. 8 illustrates a block diagram for a scrap segregation module of the robotic waste management system in accordance with an embodiment of the present disclosure. FIG. 9 illustrates a block diagram for a mobility assembly of the robotic waste management system in accordance with an embodiment of the present disclosure. FIG. 10 illustrates a block diagram for a foldable frame mechanism and power management unit in accordance with an embodiment of the present disclosure. FIG. 11 illustrates a block diagram for a control interface module of the robotic waste management system in accordance with an embodiment of the present disclosure. FIG. 12 illustrates a block diagram for a foldable actuator with a dual piston hydraulic system of the robotic waste management system in accordance with an embodiment of the present disclosure.

The encoder transmits this data to the control interface, which adjusts the hydraulic flow rate based on the segment's position. For instance, during the transition from the folded state to the operational state, the control interface ensures that the hydraulic pressure decreases as the final segment approaches full extension, preventing overextension or structural strain.

The actuator transitions seamlessly between folded and operational states through coordinated control of the dual-piston system and telescopic segments. In the folded state, all segments are fully retracted and locked using spring-loaded latches integrated into the segment joints. When transitioning to the operational state, the control interface sends a signal to release the latches, initiating the sequential extension of the segments.

The hydraulic system ensures that each segment locks into its extended position before the next segment begins deploying. Positional encoders verify the locking status by detecting the alignment of locking pins with pre-designed grooves in the segment joints. This process guarantees precise deployment, even under load conditions.

Consider a scenario where the actuator is deployed to position a robotic arm for waste segregation. The control interface calculates the required length of the telescopic extension based on sensor input detecting the waste's distance. The primary piston activates, triggering the relay valve to direct hydraulic fluid to the secondary piston. Positional encoders relay feedback to the control interface at every step, ensuring each segment deploys in the correct order and locks into place. When retracting, the hydraulic relay valve reverses fluid flow, and the positional encoders ensure each segment folds sequentially without causing misalignment or undue mechanical stress.

The multi-core processing architecture enables the system to execute multiple real-time control algorithms simultaneously. Each core is assigned specific tasks to optimize the system's performance and ensure operational precision. For instance, one core processes data from the positional encoders in the actuators to calculate the exact trajectory of the robotic arm. Another core integrates input from sensors, such as hyperspectral or proximity sensors, to identify and classify waste materials in real time. A third core handles decision-making algorithms to prioritize tasks, such as determining whether to collect metal or plastic waste first based on its position and category. By distributing these tasks across multiple cores, the module ensures that there is no processing bottleneck, even in high-demand scenarios.

The wireless communication module includes a dual-band transceiver capable of operating on both 2.4 GHz and 5 GHz frequency bands. This allows the system to adapt to varying levels of interference in the environment, ensuring reliable communication. The module uses an encrypted communication protocol to securely exchange data with other robotic agents in the waste management ecosystem. For instance, when one robotic unit detects and classifies a metal object, it shares this information with nearby units to prevent redundant collection efforts. The encrypted protocol ensures that the data is protected from external interference or cyber threats.

To illustrate, consider a scenario where three robotic agents are deployed in a recycling facility. The control interface of each agent processes its local sensor data to identify objects, such as a plastic bottle, a metal can, and a piece of cardboard. One agent classifies and collects the metal can while transmitting its updated task status to the other agents through the wireless module. The other agents, upon receiving this data, avoid collecting the same object and instead focus on collecting the remaining materials. This coordination, enabled by the dual-band transceiver and encrypted communication, ensures efficient task distribution and system-wide optimization.

In an embodiment, the telescopic folding mechanism (308) of the actuator (304) comprises: interlocking segments sequentially deployed through a hydraulically controlled sliding interface, each segment equipped with an integrated positional encoder, wherein the positional encoder includes: a high-precision rotary encoder (322$d$) mounted at the base of each telescopic segment, configured to measure angular displacement and extension length relative to an adjoining segment; a magnetic strip (322$e$) affixed along the inner surface of each segment, with a corresponding Hall-effect sensor (322$f$) embedded in the adjacent segment, said Hall-effect sensor providing continuous feedback on the positional alignment of the segments; and a control circuit (322$g$) operatively connected to the encoder and sensors, said circuit configured to process real-time positional data for each segment and detect deviations from the intended deployment sequence; and wherein the control circuit transmits the processed positional data to the control interface module, enabling dynamic adjustment of hydraulic flow to the actuator for precise positioning of the telescopic segments during the transition between the folded states and operational states, wherein in folded state, all telescopic segments are fully retracted and interlocked within the actuator's housing, the interlocking achieved through spring-loaded locking pins (322$h$) that engage with notches on the inner surface of each segment to ensure compactness and stability during transportation or idle conditions; and wherein in an operational state, the telescopic segments are sequentially deployed by a dual-piston hydraulic system, the deployment triggered by input from the control interface module upon detection of target material. Each segment transitions to its extended position through a guided sliding interface, with positional feedback provided by integrated encoders (322$i$) and Hall-effect sensors, wherein the final deployed state is locked by pneumatic clamps (322$j$) at the segment junctions to maintain structural integrity under load;

In an embodiment, the robotic arm assembly (312) operates with articulating segments driven by the harmonic drive system, wherein the rotation of the input shaft (312$b$) generates angular motion that is transmitted through a flexible spline (312$d$) to the output shaft (312$c$), creating high-torque motion at each joint, and wherein said hollow-core shafts within each segment enable internal wiring and fluid conduits to dynamically adjust their routing during articulation, while the positional feedback from torque sensors (312$e$) embedded at each joint signals the central processing unit to modify motion trajectories, ensuring collision-free operation of the robotic arm.

In an embodiment, the gripper unit (316) is configured to move in response to the robotic arm assembly (312), wherein the rotational motion of the terminal segment (312$f$) activates a micro-servo assembly (312$g$) embedded in the gripper's base, causing the opposing jaws to open or close, and wherein the gripping force is dynamically adjusted based on feedback from pressure sensors (312$h$) embedded within the jaws, while the vacuum suction pad simultaneously activates by drawing pneumatic pressure through a conduit connected to a compact pump (312$i$), enabling a synchronized two-step gripping operation for handling fragile or irregularly shaped materials.

In an embodiment, the dynamic bin carousel rotates on a motorized turntable (312$j$) controlled by a servo-driven gear assembly (312$k$), wherein the rotational motion is triggered by an input signal from the central processing unit upon classification of a scrap material, wherein turntable aligns the designated bin with the robotic arm, and an integrated locking mechanism (312$l$) releases the bin upon receiving a confirmation signal from proximity sensors mounted on the robotic arm's gripper, ensuring accurate deposition of materials into the corresponding bin.

In an embodiment, the mobility assembly (320) is configured such that the gyroscopic stabilization unit continuously detects terrain irregularities using triple-axis gyroscopic sensors (320$j$), and wherein based on detected tilts, the unit triggers individual brushless motors (320$k$) within the omnidirectional wheels to dynamically adjust their rotation speed and direction, while foldable axles extend or retract via linear actuators equipped with positional encoders, ensuring the system maintains balance and maneuverability across uneven or inclined surfaces.

In an embodiment, the foldable frame mechanism (322) transitions between states through hinged struts actuated by dual-direction linear actuators (320$l$), wherein the extension of the actuators rotates the struts outward, locking them into an operational position using spring-loaded pins (320$m$), wherein the positional encoders within the actuators continuously monitor the angle of deployment, sending real-time data to the control unit (320$n$), which halts the actuator motion upon detecting full extension, ensuring the frame remains stable during operation.

In an embodiment, the sensor array module (310) includes a laser range sensor (310$e$) mounted on a rotating gimbal (310$f$), said gimbal configured to adjust the sensor's angle based on input from a gyroscopic sensor (310$g$) within the mobility assembly, wherein the laser range sensor detects the distance to the target material and transmits this data to the central processing unit, which dynamically calculates the required extension of the telescopic arm and triggers the hydraulic actuator to extend specific segments in a sequential manner, ensuring precise alignment with the detected material.

In an embodiment, each telescopic arm segment (314) includes integrated strain gauges (314$e$) positioned at critical stress points, said gauges configured to detect real-time mechanical stress during extension or retraction, wherein the strain data is transmitted to the central processing unit, which adjusts the hydraulic pressure within the dual-piston system to reduce load on specific segments and prevent structural deformation during high-torque operations.

In an embodiment, the telescopic folding mechanism (308) is equipped with an array of proximity sensors (308a) embedded within each interlocking segment, said sensors configured to detect the position of adjacent segments during deployment, wherein the detected positions trigger locking pins (314f) to engage or disengage in synchronization with the motion of the hydraulic actuator, enabling smooth and precise folding and unfolding of the arm without misalignment or overextension.

In an embodiment, the hyperspectral imaging sensor within the sensor array (310) detects the material composition of the target scrap and transmits this data to the central processing unit (328), which calculates the optimal gripping force and extension length of the telescopic arm, wherein the system (300) subsequently activates the harmonic drive mechanism to rotate the arm and adjusts the vacuum suction pad pressure to secure the material without causing deformation.

In an embodiment, the telescopic arm assembly (312) includes an internal cable tension sensor (312m) integrated into the hollow-core shaft, said sensor configured to monitor the tension of wiring and conduits during extension, and wherein the central processing unit (328) receives tension data and dynamically adjusts the retraction sequence of the segments to prevent excessive strain or cable entanglement during arm movement.

In an embodiment, a thermal imaging sensor (310h) within the sensor array detects heat signatures of nearby objects and transmits the data to the central processing unit (328), which uses this information to calculate the optimal rotational path of the robotic arm, and wherein the system then activates the telescopic actuator to extend specific segments to avoid potential collisions, ensuring the arm's trajectory remains free of thermal obstacles during operation.

In an embodiment, the telescopic arm segments (314) are equipped with magnetic position sensors (314g) embedded within the interlocking sections, said sensors detecting the relative position and alignment of each segment during operation, this data is processed by the central processing unit (328), which adjusts the flow rate of hydraulic fluid to ensure synchronized extension or retraction of all segments, maintaining mechanical stability under variable loads.

In an embodiment, each segment of the telescopic arm includes micro-accelerometers (312n) mounted internally to detect vibrations during movement, upon detecting excessive vibrations, the accelerometers trigger the central processing unit (328) to temporarily halt actuator motion and adjust the hydraulic pressure to dampen oscillations, ensuring smooth operation and reduced wear on the interlocking segments.

In an embodiment, the proximity sensors in the sensor array (310) are configured to create a spatial map of the environment around the robotic system (300), transmitting this map to the central processing unit (328), and wherein based on this map, the telescopic arm dynamically adjusts its folding and unfolding sequence to avoid obstacles, with the hydraulic actuators and harmonic drive coordinating to maintain optimal clearance during movement.

In an embodiment, the scrap segregation module comprises the dynamic bin carousel, wherein: the circular platform is fabricated from an abrasion-resistant polymer reinforced with a high-tensile carbon fiber layer to withstand rotational stresses and heavy material loads; the platform is divided into radial slots, each slot configured with anti-slip rubberized linings to securely accommodate the detachable bins during carousel operation; the detachable bins are equipped with: magnetic tags (312i) embedded within their bases for automated identification by an RFID reader positioned beneath the platform, said reader operatively connected to the processing unit for bin tracking and material classification. An integrated weight sensor (312j) is located at the bottom of each bin, configured to transmit load data to the processing unit, enabling the dynamic bin carousel to maintain rotational balance under variable material loads. The bin locking mechanism includes spring-loaded latch system that includes precision-machined locking teeth (312k) configured to engage securely with grooves (312l) on the detachable bins; the electronic solenoid actuator operates in response to control signals from the processing unit to selectively engage or release the latches, allowing for automated bin replacement or removal during operation; a positional feedback sensor (312m) integrated into the locking mechanism provides real-time status updates on the engagement state of each latch, ensuring operational safety during material deposition or bin exchange; and wherein the dynamic bin carousel is rotated by a servo-controlled motor system (312n) equipped with an angular encoder (312o), said motor system aligning the designated bin with the robotic arm for material deposition as directed by the processing unit.

In an embodiment, the foldable frame mechanism (322) comprises: hinged struts, each pivotally connected at joint assemblies (322k) to enable rotational movement, wherein the joint assemblies include integrated angular stops to limit the range of motion during folding and unfolding; linear actuators operatively connected to the hinged struts through pivot couplings (322l), wherein the actuators: drive the folding and unfolding motion by extending or retracting along a predefined axis; include positional encoders that provide real-time feedback on the displacement of the actuators to the processing unit; locking mechanisms associated with the hinged struts, said mechanisms comprising spring-loaded locking pins that automatically engage locking recesses (322m) upon the frame reaching its fully unfolded operational state, ensuring rigidity during operation.

An interconnection system (322n) is provided that comprises synchronization rods (322o) linking adjacent hinged struts, wherein the rods translate the motion of one strut to the others, enabling synchronized movement during folding and unfolding; and wherein the processing unit monitors the positional encoder feedback and dynamically adjusts the actuator's motion to achieve coordinated folding and unfolding of the frame, while the locking mechanisms are disengaged based on signals from proximity sensors detecting the folded state of the frame.

In an embodiment, each wheel includes integrated roller mechanisms positioned radially around its circumference, each roller mounted on independent bearings to enable multi-directional movement without requiring wheel rotation, and each wheel comprises wheel hubs (320o) coupled with individual high-torque brushless DC-motors (320k), said motors configured to independently control the rotational speed and direction of each wheel, allowing synchronized lateral and rotational movement in confined spaces; wherein torque sensors (320p) integrated within the motor housing continuously monitor traction forces, transmitting real-time feedback to the processing unit to optimize wheel movement on varying surfaces.

In an embodiment, each foldable axle is composed of interlocking tubular sections (320q), the sections connected by precision-engineered hinge joints that allow angular folding driven by servo-controlled actuators (320*r*), the hinge joints include positional encoders and micro-locking pins (320*s*) that engage automatically during the folding or extension process, ensuring axial alignment and load stability, and wherein a damping mechanism (320*u*) embedded within the hinge joints prevents sudden motion during the folding transition, reducing impact forces on adjacent components, and wherein the triple-axis gyroscope is configured to detect tilt and angular displacement in real time.

In an embodiment the central processing unit (CPU) within the control interface module is mounted on shock-dampening mounts to ensure consistent operation in environments with significant mechanical vibrations. These mounts are designed using multi-layer elastomeric materials, positioned at the corners of the CPU housing. This configuration absorbs vibrations and prevents damage to delicate electronic components during the system's mobility or material handling operations. For example, if the robotic system operates on uneven terrain, the mounts isolate the CPU from the sudden impacts, ensuring uninterrupted performance.

The CPU uses a multi-core architecture where each core is assigned specific tasks to optimize processing efficiency. One core is designated for real-time actuator control, processing data from positional encoders and torque sensors to execute precise movement trajectories. Another core integrates sensor data, such as input from the hyperspectral imaging module and proximity sensors, to detect and classify material composition. For instance, the CPU uses input from optical sensors to distinguish between metallic and non-metallic objects, adjusting the robotic arm's trajectory accordingly. A third core handles coordination with other robotic systems in the waste management ecosystem by processing communication signals received from the wireless communication module.

The CPU is equipped with a hardware-based watchdog timer, a fail-safe mechanism that monitors the execution of its tasks. If a task exceeds its predefined execution time, the watchdog timer initiates a reset of the relevant subsystem without affecting other ongoing processes. For example, if the actuator trajectory computation encounters an error, the watchdog timer ensures that only the actuator control core is reset while maintaining uninterrupted sensor data integration and communication operations.

In an embodiment, the control interface module utilizes pixel-level segmentation masks generated by an integrated Mask R-CNN to enhance the operation of the articulated robotic arms and specialized grippers, the module comprising: a feature extraction subunit (326*a*) operatively connected to the sensor array, wherein the subunit employs a pre-trained convolutional neural network to process input images captured by hyperspectral imaging sensors and extract high-level object features; a Region Proposal Network (RPN) operatively linked with the control interface's central processing unit, said RPN configured to identify regions of interest within the images, wherein positional data from the segmentation masks is used to refine the robotic arm's trajectory during waste collection; and a segmentation mask subunit integrated within the control interface module, wherein the subunit generates binary masks of detected objects using pixel-level boundary data, and transmits this data to the processing unit for real-time adjustments of the articulated robotic arms and grippers during material handling.

In the robotic waste management system, the Mask R-CNN technique is used to identify and delineate waste materials for precise segregation by the robotic arms and grippers. For example, consider an image captured by the hyperspectral sensor in the system, which contains a plastic bottle, a metallic can, and an irregularly shaped piece of organic waste. This image is processed by the feature extraction subunit within the control interface module, which uses a pre-trained convolutional neural network to identify features specific to each object. The smooth surface and distinct neck of the plastic bottle, the reflective cylindrical surface of the metallic can, and the uneven texture of the organic waste are extracted as high-level features.

These features are passed to the Region Proposal Network (RPN), which identifies bounding boxes around potential objects. In this case, the RPN generates three bounding boxes: one around the plastic bottle, one for the metallic can, and one for the organic waste. The bounding boxes are refined based on positional feedback from the robotic arm's positional encoders, ensuring accurate alignment with the physical space. The system classifies the objects within these bounding boxes as "plastic," "metal," and "organic waste," respectively, and assigns this classification data to specific bins on the dynamic bin carousel.

To further refine the operation, Mask R-CNN generates pixel-level segmentation masks for each object. For the plastic bottle, the mask precisely outlines its contours, including the neck and base. For the metallic can, the mask captures its cylindrical shape, and for the organic waste, the mask delineates its irregular boundary. These segmentation masks are transmitted to the control interface, which dynamically adjusts the robotic arm's trajectory. For instance, the harmonic drive in the robotic arm rotates the arm to align with the detected boundary of the plastic bottle. The telescopic segments extend sequentially, guided by the positional encoders, to reach the exact position of the bottle.

Once the robotic arm is aligned, the gripper adjusts its configuration based on the segmentation mask data. In the case of the plastic bottle, the gripper activates its vacuum suction pad to securely hold the smooth surface without deforming the material. For the metallic can, the gripper's jaws are configured to apply a calibrated force to avoid crushing, while for the organic waste, the gripper widens its jaws to handle the irregular shape effectively. After collecting the material, the dynamic bin carousel receives the classification and positional data and rotates to align the appropriate bin with the robotic arm's position. The arm deposits the material into the designated bin, and the locking mechanism secures the bin during this operation.

This integration of Mask R-CNN with the system's components ensures precise handling of waste materials, such as distinguishing recyclable plastics from non-recyclable ones based on their boundaries and shapes. For instance, two visually similar plastic bottles might be differentiated using fine boundary details captured by the segmentation mask, allowing the system to sort one as recyclable and the other as waste. This detailed, example-driven implementation highlights how Mask R-CNN enables the robotic system to achieve accurate, real-time waste segregation.

In an embodiment, the articulated robotic arms adjust their angular motion based on segmentation mask data received from the control interface module, said data enabling the harmonic drive mechanism to position the robotic arm precisely over irregularly shaped waste materials, while the telescopic segments extend sequentially to maintain optimal positioning for material collection, wherein the dynamic bin carousel receives object type and positional data derived from segmentation masks processed by the control interface module, wherein: the carousel aligns the designated bin with the robotic arm by adjusting its rotational angle through servo-controlled motors (320v); and the bin locking mechanism is dynamically triggered based on segmentation mask classifications to engage or release specific bins for depositing categorized waste materials.

In an embodiment, the telescopic folding mechanism is dynamically synchronized with segmentation mask data processed by the control interface module, enabling: the telescopic arm to deploy specific segments to align with the precise boundary of the waste material identified by the Mask R-CNN; and the positional encoders in the telescopic arm to verify alignment with the identified waste material boundary and transmit real-time corrections to the processing unit during collection operations.

Figure 4:
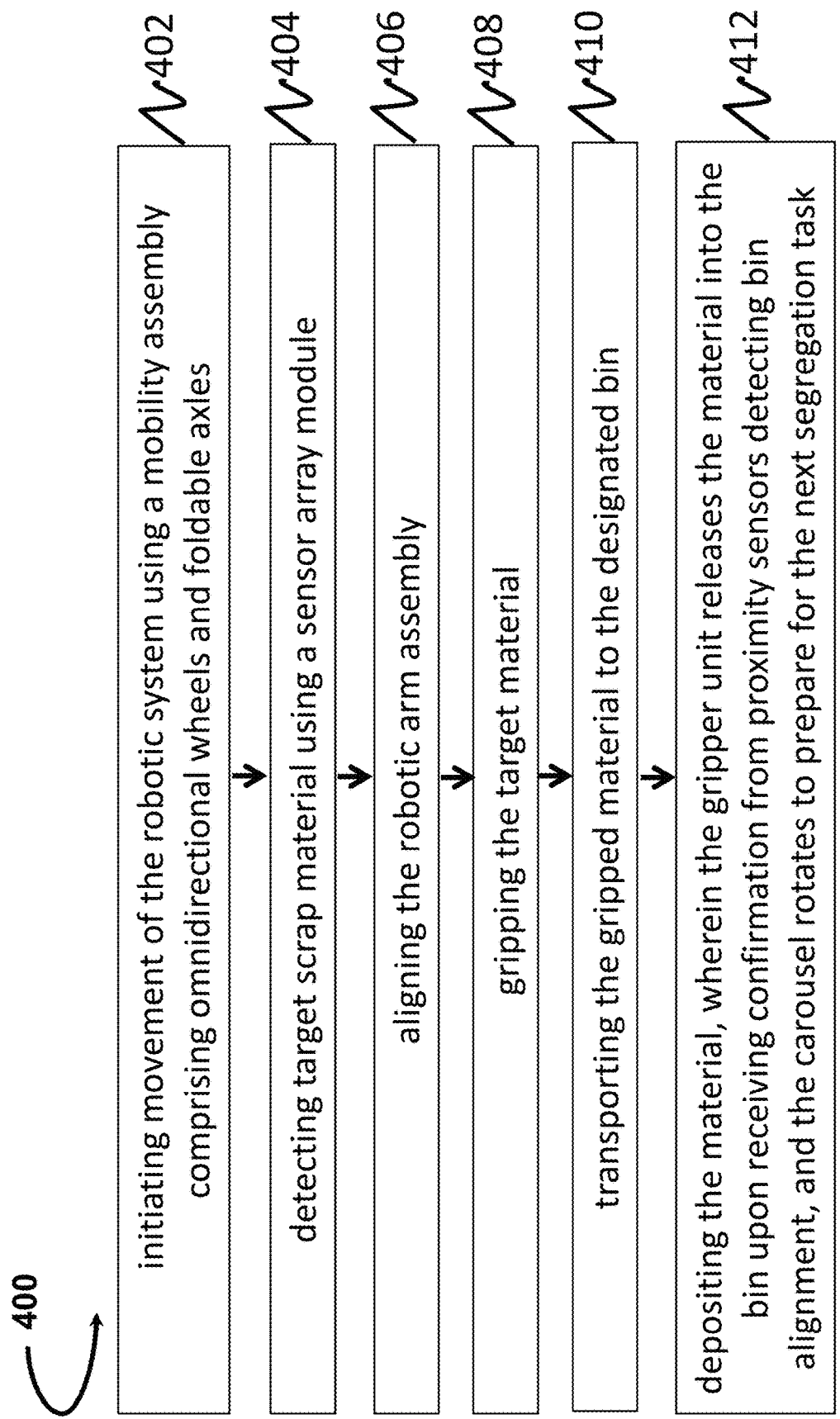
FIG. 4 illustrates a method of operating a multi-agent-based scrap collection and segregation robotic system for a waste management ecosystem in accordance with an embodiment of the present disclosure.

FIG. 4 illustrates a method (400) of operating a multi-agent-based scrap collection and segregation robotic system for a waste management ecosystem in accordance with an embodiment of the present disclosure.

Referring to FIG. 4, the method (400) includes a plurality of steps as described under:

At step (402), the method (400) includes initiating movement of the robotic system using a mobility assembly comprising omnidirectional wheels and foldable axles, wherein gyroscopic sensors detect terrain irregularities and adjust wheel speed and axle position to maintain stability.

At step (404), the method (400) includes detecting target scrap material using a sensor array module, wherein hyperspectral imaging and proximity sensors identify material composition and spatial location relative to the system.

At step (406), the method (400) includes aligning the robotic arm assembly, wherein positional data from the sensor array triggers the rotation of the arm's pivoting base via a harmonic drive system, and articulating segments of the robotic arm adjust their angles based on torque feedback to position the gripper unit precisely over the target material.

At step (408), the method (400) includes gripping the target material, wherein the gripper unit activates its serrated jaws and vacuum suction pad based on the material's properties detected by capacitive sensors; and the gripping force is dynamically adjusted using embedded load sensors to ensure secure handling of the material.

At step (410), the method (400) includes transporting the gripped material to the designated bin, wherein the robotic arm rotates and extends to position the material over a dynamic bin carousel, and the bin is identified by an RFID scanner embedded within the carousel platform.

At step (412), the method (400) includes depositing the material, wherein the gripper unit releases the material into the bin upon receiving confirmation from proximity sensors detecting bin alignment, and the carousel rotates to prepare for the next segregation task.

The proposed robotic system utilizes a sophisticated network of sensors, actuators, and cameras to detect, collect, and segregate various types of waste materials. The Hardware-in-loop technology ensures precise control over sensor and actuator movements, enabling efficient sorting of materials. Meanwhile, the Software-in-loop component leverages real-time artificial intelligence techniques for object detection and decision-making, further enhancing the device's efficiency and accuracy.

Energy sustainability is a key focus of the invention, with a hybrid power system comprising batteries and solar photovoltaic panels. The integration of multi-grid power regulators optimizes energy utilization, ensuring uninterrupted operation even in challenging environmental conditions. This eco-friendly approach not only reduces the device's carbon footprint but also contributes to overall environmental conservation efforts.

The device's versatility is underscored by its ability to operate independently as a standalone unit or in coordination with multiple devices through multi-agent based operations. This flexibility allows for seamless integration into existing waste management ecosystems, enhancing overall efficiency and scalability.

Key components of the robotic system include actuators relay switch for precise control over movements, Lidar camera for accurate depth sensing, sinusoidal grip-based actuator for efficient material handling, arms collection, and separation mechanism for sorting metal, plastic, organic waste, and other materials, as well as cameras for object detection and identification.

Figure 5:
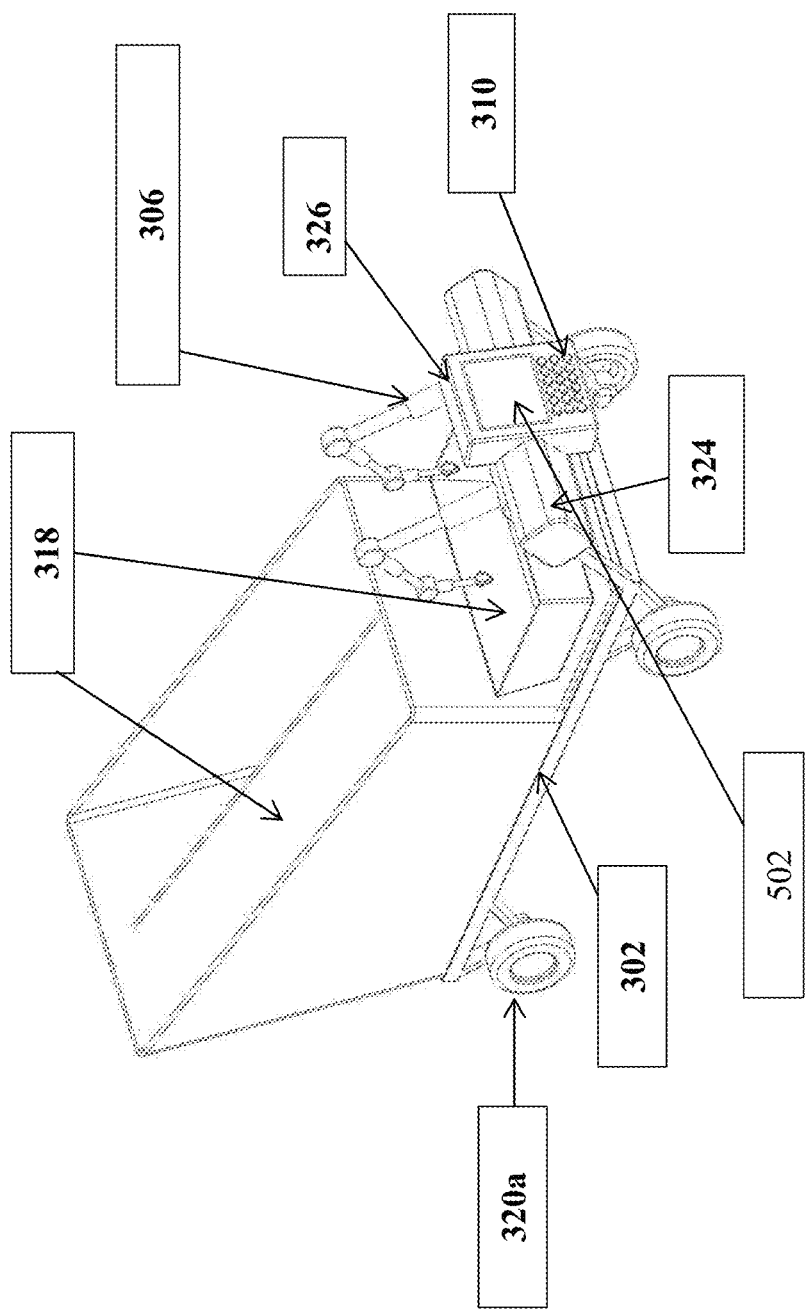
FIG. 5 (a) and FIG. 5 (b) illustrate a schematic diagram of the proposed multi-agent-based scrap collection and segregation robotic system for waste management.
Figure 5:
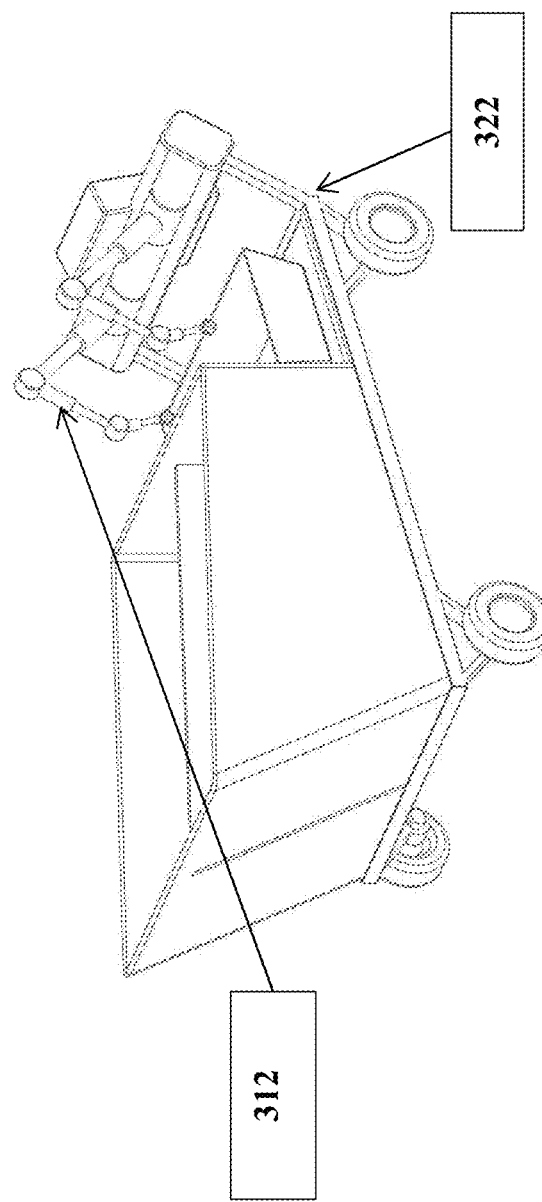

FIG. 5 (a) and FIG. 5 (b) illustrate a schematic diagram of the proposed multi-agent-based scrap collection and segregation robotic system for waste management. The proposed system includes plurality of main components namely; scrap segregation module (318), chassis (302), LED display (502), compact dual-piston hydraulic (306), control interface module (326), sensor array module (310), power management unit (324), robotic arm assembly (312), and foldable frame mechanism (322).

The scrap segregation module (318) comprises: a dynamic bin carousel, wherein the carousel comprises a circular platform fabricated from abrasion-resistant polymer, the platform is divided into radial slots designed to hold detachable bins, each bin equipped with magnetic tags for automated bin identification; and a bin locking mechanism, comprising a spring-loaded latch and an electronic solenoid actuator, configured to engage and release bins based on control signals from the processing unit.

The chassis (302) comprises a rigid central frame formed of corrosion-resistant alloy with integrated weight-distribution support beams to prevent structural deformation during operation; mounting brackets to securely attach actuators, robotic arms, and sensor modules; and a reinforced compartment housing for protecting the power management unit and processing unit against mechanical impacts.

The proposed system utilized LED Display for showing useful information to the users. The system includes a compact dual-piston hydraulic (306) to generate precise linear or rotational motion. The control interface module (326) includes a central processing unit (328), mounted on shock-dampening mounts within the chassis, configured with a multi-core architecture to execute real-time control techniques for actuators and sensor integration, and a wireless communication module, comprising a dual-band transceiver and an encrypted communication protocol for coordinating with other robotic systems in the waste management ecosystem.

The sensor array module (310) comprises an infrared proximity sensor, a capacitive touch sensor, and an industrial-grade hyperspectral imaging sensor mounted on a swiveling head attached to the chassis (302), and wherein the hyperspectral imaging sensor is configured to identify material composition and contaminants by analyzing reflected light spectra, and wherein the capacitive touch sensor is embedded within the gripper unit to detect and classify surface textures of scrap material.

The power management unit (324) comprises a modular lithium-ion battery pack enclosed within a thermally insulated casing to ensure optimal performance in varying environmental conditions.

The robotic arm assembly (312) is mounted on a precision-machined rotary base fixed to the chassis (302), and comprises a multiple articulating segments, and adjustable gripper unit. The foldable frame mechanism (322) comprises the mechanism comprises hinged struts fabricated from lightweight aluminum alloy, wherein each strut is connected to linear actuators equipped with positional encoders for synchronized folding and unfolding of the frame.

The robotic system for waste management is a complex integration of mechanical components designed to perform various tasks related to waste collection, segregation, and processing. Below is a detailed explanation of the mechanical components and their functionalities:

The robotic system is built upon a sturdy chassis and frame that provide structural support and stability. The chassis is typically made of lightweight yet durable materials such as aluminum or carbon fiber to minimize weight while ensuring strength and rigidity. The frame houses all other mechanical and electronic components of the robotic system and is designed to withstand the rigors of operating in diverse environments, including landfill sites and urban areas.

Mobility is a critical aspect of the robotic system, allowing it to navigate through various terrains and environments. Depending on the application and requirements, the robotic system may be equipped with wheels or tracks for locomotion. Wheels provide agility and maneuverability on flat surfaces, while tracks offer enhanced traction and stability on uneven or rugged terrain. The wheels or tracks are driven by electric motors and are typically equipped with suspension systems to absorb shocks and vibrations.

Actuators are responsible for executing mechanical movements and actions, such as grasping, lifting, and manipulating objects. The robotic system may incorporate various types of actuators, including electric motors, hydraulic cylinders, or pneumatic actuators, depending on the application and payload requirements. Grippers are specialized end-effectors attached to the actuators, designed to securely grasp and manipulate waste materials. Different types of grippers may be used for handling different types of waste, such as claw-like grippers for bulky items and suction-based grippers for flat or irregularly shaped objects.

Sensors play a crucial role in enabling the robotic system to perceive its environment and make informed decisions. The robotic system may be equipped with a diverse array of sensors, including proximity sensors, cameras, LiDAR (Light Detection and Ranging), ultrasonic sensors, and thermal sensors. These sensors provide real-time feedback on the surrounding environment, including object detection, distance measurement, obstacle avoidance, and environmental conditions. For waste management applications, sensors are used to identify and classify different types of waste materials, detect obstacles and hazards, and navigate through cluttered environments.

The robotic system incorporates specialized mechanisms for collecting and segregating waste materials. These mechanisms may include conveyor belts, rotating drums, or articulated arms equipped with sensors and grippers. The collection mechanism is responsible for gathering waste materials from the environment, while the segregation mechanism sorts the materials based on predefined criteria, such as material type, size, or recyclability.

The robotic system is powered by onboard batteries or a combination of batteries and renewable energy sources such as solar panels. A sophisticated power management system regulates the supply of power to the various components of the robotic system, optimizing energy usage and ensuring uninterrupted operation. The system may incorporate charging stations or docking stations for recharging the batteries during idle periods or between tasks.

The control system serves as the brain of the robotic system, coordinating the operation of all mechanical and electronic components. It comprises microcontrollers, processors, and other electronic hardware responsible for executing control techniques, sensor fusion, path planning, and decision-making. The control system communicates with external devices and central control centers via wireless communication protocols such as Wi-Fi, Bluetooth, or cellular networks, enabling remote monitoring and control of the robotic system.

The robotic system utilizes a combination of actuators, cameras, sensors, and a collection bin equipped with an arms collection and separation mechanism to efficiently identify, collect, and segregate different types of waste materials, including metal, plastic, organic waste, and other forms. Here's how each component works together in the separation process:

Actuators: Actuators are responsible for executing mechanical movements and actions required for waste collection and segregation. In this system, the actuators control the movement of the robotic arms and other mechanical components involved in the collection and separation process. The actuators are equipped with grippers or end-effectors designed to securely grasp and manipulate waste materials during the sorting operation.

Cameras are used for visual perception and object recognition, enabling the robotic system to identify and classify different types of waste materials. High-resolution cameras mounted on the robotic platform capture images of the surrounding environment, which are then processed using computer vision techniques to detect and analyze objects of interest. Object recognition techniques are trained to distinguish between various materials based on visual features such as color, shape, texture, and size.

In a Multi-Agent Based Scrap Collection and Segregation Robotic System, object recognition techniques are employed to classify waste materials based on their visual features, enabling the robotic agents to identify, collect, and segregate materials with precision. These techniques process image data captured by sensors, such as hyperspectral or RGB cameras, to extract visual characteristics of waste items, including shape, texture, color, and surface reflectivity. For instance, when an agent encounters a pile of mixed waste, its camera captures an image of the scene. The object recognition technique processes this image using feature extraction techniques. If the system uses a convolutional neural network (CNN), features such as the smooth and curved surface of a plastic bottle, the shiny, reflective surface of a metallic can, or the irregular texture of organic waste are identified. These features are compared against a pre-trained dataset to classify each object into categories like "plastic," "metal," "organic," or "general waste."

Once classified, the information is sent to the agent's control module, which determines the next steps. For example, the robotic arm is guided to position its gripper precisely around the identified object, adjusting its approach based on the object's shape and orientation. If the object is a metallic can, the system might employ additional feedback from sensors like weight or density to confirm the classification before depositing it into the appropriate bin on the dynamic bin carousel.

The waste management system is equipped with high-resolution cameras mounted strategically to capture images of the surrounding environment. These cameras capture images in real-time as the robotic system navigates through the waste material. The captured images are processed using advanced image processing techniques, which are part of the system's software component. These techniques analyze the visual information in the images to identify and classify different types of waste materials based on specific visual features such as color, texture, shape, and size.

Object detection techniques are employed to identify individual objects or waste items within the captured images. Once detected, the system utilizes object classification techniques to categorize the waste items into pre-defined classes or categories such as metal, plastic, organic waste, and general waste. This classification is based on the unique visual characteristics of each type of waste material. Based on the classification results, the system makes decisions on how to handle each waste item. For example, it may instruct the robotic arms to pick up and deposit the waste item into the appropriate compartment of the collection bin based on its classification.

Electric motors are commonly used as actuators in robotic systems due to their precision, controllability, and efficiency. They can be employed to drive wheels or tracks for locomotion, as well as to control the movement of robotic arms and grippers during waste collection and segregation tasks. Electric motors offer smooth and precise movement, making them suitable for applications requiring accurate positioning and manipulation of objects. Hydraulic actuators utilize pressurized hydraulic fluid to generate mechanical force and motion. They are well-suited for applications requiring high force output, such as lifting heavy loads or operating heavy-duty machinery. In the waste management system, hydraulic cylinders may be employed in conjunction with the arms collection and separation mechanism to provide the necessary force for lifting and manipulating bulky waste items. Pneumatic actuators use compressed air to produce linear or rotary motion. They are lightweight, cost-effective, and easy to control, making them suitable for a wide range of robotic applications. In the waste management system, pneumatic actuators may be utilized for tasks such as opening and closing grippers, extending and retracting arms, or operating conveyor belts for waste transport.

In the waste management system, servo motors may be employed to control the movement of robotic arms and grippers with utmost precision, ensuring accurate positioning and manipulation of waste materials during the segregation process.

In addition to cameras, the robotic system may incorporate a variety of sensors to gather additional information about the environment and the waste materials being processed. Proximity sensors, ultrasonic sensors, and LiDAR sensors provide real-time feedback on the location, distance, and orientation of objects in the robot's vicinity. These sensors help the robot navigate through cluttered environments, avoid obstacles, and interact safely with its surroundings.

The collection bin serves as the receptacle for storing the segregated waste materials once they have been sorted by the robotic system. The bin is typically equipped with compartments or partitions to separate different types of materials, such as metal, plastic, organic waste, and general waste. As the robotic arms collect and segregate waste materials, they deposit them into the appropriate compartments within the collection bin, ensuring proper separation and storage.

Arms Collection and Separation Mechanism: The arms collection and separation mechanism is the key component responsible for physically sorting the waste materials into different categories. This mechanism typically consists of articulated robotic arms equipped with specialized grippers or end-effectors for grasping and manipulating objects. The arms are programmed to perform precise movements and actions to pick up, transport, and deposit waste materials into the designated compartments within the collection bin.

One specific technique that is quite different from traditional object detection techniques is called "Mask R-CNN." Mask R-CNN is an extension of Faster R-CNN that not only detects objects within an image but also generates pixel-level segmentation masks for each detected object, outlining the precise boundaries of the objects. This technique is particularly relevant to the robotic waste management system as it allows for more accurate and detailed identification of waste materials, enabling finer-grained segmentation and sorting.

In the context of the robotic waste management system, Mask R-CNN offers several advantages over traditional bounding box detection techniques. By providing pixel-level segmentation masks for each detected object, Mask R-CNN enables the robotic system to precisely delineate the boundaries of different types of waste materials within the image. This level of detail allows for more accurate classification and segregation of waste materials, ensuring that each type of material is properly identified and sorted according to its category.

The implementation of Mask R-CNN within the robotic waste management system involves several key steps. First, a pre-trained convolutional neural network (CNN), such as ResNet or VGG, is used to extract high-level features from the input image. These features are then fed into a Region Proposal Network (RPN), which generates candidate object proposals or regions of interest within the image. Next, these proposals are refined and classified into specific object categories using a series of convolutional and fully connected layers.

What sets Mask R-CNN apart from traditional object detection techniques is its additional branch for generating segmentation masks. After identifying and classifying the objects within the image, Mask R-CNN employs a separate sub-network to predict pixel-level masks for each detected object. This sub-network takes as input the features corresponding to the proposed object regions and produces a binary mask indicating the spatial extent of each object within the image.

The pixel-level segmentation masks generated by Mask R-CNN provide valuable information about the precise shape and boundaries of the detected objects, enabling the robotic system to perform more accurate and reliable waste segregation. For example, the system can use the segmentation masks to distinguish between different types of plastic materials based on their unique shapes and textures, ensuring that recyclable plastics are separated from non-recyclable ones effectively.

Mask R-CNN represents a powerful and innovative technique for object detection and segmentation, offering unprecedented levels of detail and accuracy in identifying and delineating objects within images. By incorporating Mask R-CNN into the robotic waste management system, the system can achieve more precise and efficient waste segregation, contributing to improved recycling efforts and environmental sustainability.

The technique of separation employed by the robotic system varies depending on the specific characteristics of the waste materials being processed. For example:

Ferrous and non-ferrous metals can be separated using magnetic or electromagnetic sorting techniques. The robotic system may utilize magnets or electromagnets to attract and separate ferrous metals from other materials based on their magnetic properties. Plastics can be sorted based on their optical properties, such as color and transparency, using optical sorting techniques. The robotic system may use cameras and computer vision techniques to identify and separate different types of plastics based on visual cues. Organic waste, such as food scraps and biodegradable materials, can be separated using biological or mechanical processes. The robotic system may employ composting or anaerobic digestion techniques to process organic waste separately from other materials.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A multi-agent-based scrap collection and segregation robotic system for a waste management ecosystem, comprising:
   a chassis, comprising:
      a rigid central frame formed of a corrosion-resistant alloy with integrated weight-distribution support beams to prevent a structural deformation during operation;
      mounting brackets to securely attach actuators, robotic arms, and sensor modules;
      a reinforced compartment housing for protecting a power management unit and a central processing unit against mechanical impacts;
      a plurality of foldable actuators, wherein each foldable actuator comprises a compact dual-piston hydraulic system configured to generate precise linear or rotational motion; said plurality of foldable actuators are operatively connected to a telescopic folding mechanism comprising interlocking telescopic segments made of lightweight composite material, enabling the robotic system to transition between a compact transportable state and an operational state; and
      a sensor array module, wherein the sensor array module comprises an infrared proximity sensor, a capacitive touch sensor, and an industrial-grade hyperspectral imaging sensor mounted on a swiveling head attached to the chassis, and wherein the industrial-grade hyperspectral imaging sensor is configured to identify material composition and contaminants by analyzing reflected light spectra, and wherein the capacitive touch sensor is embedded within an adjustable gripper unit to detect and classify surface textures of a scrap material;
   a robotic arm assembly, mounted on a precision-machined rotary base fixed to the chassis, said robotic arm assembly comprising:
      multiple articulating segments, each articulating segment containing a hollow-core shaft for housing internal wiring and fluid conduits, a harmonic drive system for smooth and high-torque angular motion; and the adjustable gripper unit, wherein:
         the adjustable gripper unit comprises dual opposing jaws with serrated edges and a central vacuum suction pad for handling irregularly shaped or fragile materials;
         the dual opposing jaws are driven by miniature servo motors with load-bearing torque sensors to optimize gripping force; and
         the central vacuum suction pad is connected to an onboard pneumatic pump housed within the chassis;
   a scrap segregation module, comprising:
      a dynamic bin carousel, wherein the dynamic bin carousel comprises a circular platform fabricated from an abrasion-resistant polymer, wherein the circular platform is divided into radial slots designed to hold detachable bins, each bin equipped with magnetic tags for automated bin identification;
   a bin locking mechanism, comprising a spring-loaded latch and an electronic solenoid actuator, configured to engage and release bins based on control signals from the central processing unit;
   a mobility assembly, comprising:
      a pair of omnidirectional wheels, each of the omnidirectional wheels containing integrated roller mechanisms for seamless lateral and rotational movement; and
      foldable axles, wherein the foldable axles are made of high-tensile steel tubes with hinge joints actuated by electric motors for folding the omnidirectional wheels into the chassis during transport;
   a gyroscopic stabilization unit, comprising a triple-axis gyroscope mounted on shock-absorbing mounts, configured to dynamically adjust a center of gravity of the robotic system during operation;
   a foldable frame mechanism, wherein:
      the foldable frame mechanism comprises hinged struts fabricated from lightweight aluminum alloy, and
      each hinged strut is connected to linear actuators equipped with positional encoders for synchronized folding and unfolding of the rigid central frame;
   the power management unit, comprising: a modular lithium-ion battery pack enclosed within a thermally insulated casing to ensure optimal performance in varying environmental conditions; and
   a control interface module, comprising the central processing unit, mounted on shock-dampening mounts within the chassis, configured with a multi-core architecture to execute real-time control for actuators and sensor integration, and a wireless communication module, comprising a dual-band transceiver and an encrypted communication protocol for coordinating with other robotic systems in the waste management ecosystem.

2. The system of claim 1, wherein:
each piston of the dual-piston hydraulic system is constructed from high-strength stainless steel with a microchannel surface pattern to enhance fluid flow efficiency and reduce hydraulic lag, said piston is housed within a sealed cylindrical chamber lined with nitrile-based elastomer to minimize wear during high-pressure operation, and wherein micro-valve assemblies include precision-machined orifices with a diameter tolerance of ±0.01 mm to ensure uniform pressure distribution for synchronized motion; and
the telescopic folding mechanism, wherein the interlocking telescopic segments are fabricated from carbon-fiber-reinforced polymer with integrated strain gauges to monitor real-time structural stress during deployment; a plurality of internal locking notches are machined at an angle of 45 degrees to ensure maximum interlock force under dynamic load conditions, and wherein each of the interlocking telescopic segment is equipped with an integrated linear displacement sensor connected to the control interface module for precise positional feedback during folding and unfolding operations.

3. The system of claim 1, wherein the compact dual-piston hydraulic system configured such that a primary piston generates an initial linear motion, which in turn triggers a secondary piston through a synchronized hydraulic relay valve, said synchronized hydraulic relay valve directing fluid to extend or contract the interlocking telescopic segments, and wherein the interlocking telescopic segments are sequentially deployed, with an integrated positional encoder detecting an extension state of each of the interlocking telescopic segment and transmitting signals to the control interface module, enabling precise adjustment of a position of the actuator during a transition between a folded state and an operational state.

4. The system of claim 3, wherein the telescopic folding mechanism of each of the actuator comprises:
the interlocking telescopic segments sequentially deployed through a hydraulically controlled sliding interface, each of the interlocking telescopic segment equipped with an integrated positional encoder, wherein the integrated positional encoder includes:
a high-precision rotary encoder mounted at a base of each of the interlocking telescopic segment, configured to measure angular displacement and extension length relative to an adjoining segment;
a magnetic strip affixed along an inner surface of each of the interlocking telescopic segment, with a corresponding Hall-effect sensor embedded in an adjacent segment, said Hall-effect sensor providing continuous feedback on the positional alignment of the interlocking telescopic segments; and
a control circuit operatively connected to the integrated positional encoder and sensors, said control circuit configured to process real-time positional data for each of the interlocking telescopic segment and detect deviations from an intended deployment sequence;
wherein:
the control circuit transmits the real-time positional data being processed to the control interface module, enabling dynamic adjustment of hydraulic flow to the actuators for precise positioning of the interlocking telescopic segments during the transition between the folded state and the operational state, and
in folded state, the interlocking telescopic segments are fully retracted and interlocked within an actuator's housing, the interlocking achieved through spring-loaded locking pins that engage with plurality of internal locking notches on the inner surface of each of the interlocking telescopic segment to ensure compactness and stability during transportation or idle conditions.

5. The system of claim 1, wherein:
in the operational state, the interlocking telescopic segments are sequentially deployed by the compact dual-piston hydraulic system, a deployment triggered by input from the control interface module upon detection of a target material,
each of the interlocking telescopic segment transitions to its extended position through a guided sliding interface, and
a final deployed state is locked by pneumatic clamps at junctions of the interlocking telescopic segment to maintain a structural integrity under load.

6. The system of claim 1, wherein:
the robotic arm assembly operates with the articulating segments driven by the harmonic drive system,
the rotation motion of an input shaft generates angular motion that is transmitted through a flexible spline to an output shaft, creating high-torque motion at each joint, and
hollow-core shafts within each of the articulating segments enable internal wiring and fluid conduits to dynamically adjust their routing during articulation, while a positional feedback from torque sensors embedded at each joint signals the central processing unit to modify motion trajectories, ensuring collision-free operation of the robotic arms.

7. The system of claim 1, wherein:
the adjustable gripper unit is configured to move in response to the robotic arm assembly,
the rotational motion of a terminal segment activates a micro-servo assembly embedded in a base of the adjustable gripper unit base, causing the dual opposing jaws to open or close, and
a gripping force is dynamically adjusted based on feedback from pressure sensors embedded within the dual opposing jaws, while the central vacuum suction pad simultaneously activates by drawing pneumatic pressure through a conduit connected to a compact pump, enabling a synchronized two-step gripping operation for handling fragile or irregularly shaped materials, and
the dynamic bin carousel rotates on a motorized turntable controlled by a servo-driven gear assembly, wherein the rotational motion is triggered by an input signal from the central processing unit upon classification of a scrap material, wherein turntable aligns the designated bin with the robotic arms, and an integrated locking mechanism releases the bin upon receiving a confirmation signal from proximity sensors mounted on the adjustable gripper unit, ensuring accurate deposition of materials into the corresponding bin.

8. The system of claim 1, wherein:
the mobility assembly is configured such that the gyroscopic stabilization unit continuously detects terrain irregularities using triple-axis gyroscopic sensors,
based on detected tilts, the gyroscopic stabilization unit triggers individual brushless motors within the omnidirectional wheels to dynamically adjust their rotation speed and direction, while foldable axles extend or retract via the linear actuators equipped with positional encoders, transitions of the foldable frame mechanism between states through the hinged struts actuated by dual-direction linear actuators, the extension of the actuators rotates the hinged struts outward, locking them into an operational position using spring-loaded pins, and the positional encoders within the linear actuators continuously monitor an angle of deployment, sending real-time data to the control interface module, which halts an actuator motion upon detecting full extension, ensuring the rigid central frame remains stable during operation.

9. The system of claim 1, wherein:

the sensor array module includes a laser range sensor mounted on a rotating gimbal, said rotating gimbal configured to adjust an angle of the laser range sensor based on input from a gyroscopic sensor within the mobility assembly, and the laser range sensor detects a distance to a target material and transmits this data to the central processing unit, which dynamically calculates a required extension of a telescopic arm and triggers a hydraulic actuator to extend the interlocking telescopic segments in a sequential manner, ensuring precise alignment with a detected material.

10. The system of claim 9, wherein:

each of the interlocking telescopic segment includes integrated strain gauges positioned at critical stress points, said integrated strain gauges configured to detect real-time mechanical stress during extension or retraction, a strain data is transmitted to the central processing unit, which adjusts a hydraulic pressure within the compact dual-piston hydraulic system to reduce load on the interlocking telescopic segments and prevent a structural deformation during high-torque operations, and the telescopic folding mechanism is equipped with an array of proximity sensors embedded within each of the interlocking telescopic segment, said proximity sensors configured to detect the position of adjacent segments during deployment.

11. The system of claim 9, wherein:

each of the interlocking telescopic segments of the telescopic arm includes micro-accelerometers mounted internally to detect vibrations during movement, upon detecting excessive vibrations, the micro-accelerometers trigger the central processing unit to temporarily halt actuator motion and adjust a hydraulic pressure to dampen oscillations, ensuring smooth operation and reduced wear on the interlocking telescopic segments, the proximity sensors in the sensor array module are configured to create a spatial map of an environment around the robotic system, transmitting the spatial map to the central processing unit, and based on the spatial map, the telescopic arm dynamically adjusts its folding and unfolding sequence to avoid obstacles, with the hydraulic actuator and the harmonic drive system coordinating to maintain optimal clearance during movement.

12. The system of claim 1, wherein:

the hyperspectral imaging sensor within the sensor array module detects the material composition of the target scrap material and transmits this data to the central processing unit, which calculates an optimal gripping force and extension length of a telescopic arm, the harmonic drive system is subsequently activated to rotate the robotic arms and adjusts a pressure of the central vacuum suction pad to secure the material without causing deformation, and a thermal imaging sensor within the sensor array module detects heat signatures of nearby objects and transmits the data to the central processing unit, which uses this information to calculate an optimal rotational path of the robotic arms.

13. The system of claim 1, wherein:

a telescopic arm assembly includes an internal cable tension sensor integrated into the hollow-core shaft, said internal cable tension sensor configured to monitor a tension of wiring and conduits during extension, the central processing unit receives tension data and dynamically adjusts a retraction sequence of the interlocking telescopic segments to prevent excessive strain or cable entanglement during arm movement, the interlocking telescopic segments are equipped with magnetic position sensors, said internal cable tension sensor detecting a relative position and alignment of each of the interlocking telescopic segments during operation, and wherein the tension data is processed by the central processing unit, which adjusts a flow rate of hydraulic fluid to ensure synchronized extension or retraction of all segments.

14. The system of claim 1, wherein:

the circular platform is divided into radial slots, each slot configured with anti-slip rubberized linings to securely accommodate the detachable bins during operation of the dynamic bin carousel; the detachable bins are equipped with:

a plurality of magnetic tags embedded within their bases for automated identification by an RFID reader positioned beneath the circular platform, said RFID reader operatively connected to the central processing unit for bin tracking and material classification;

an integrated weight sensor located at a bottom of each bin, configured to transmit load data to the central processing unit, enabling the dynamic bin carousel to maintain rotational balance under variable material loads; and the bin locking mechanism, wherein:

the spring-loaded latch includes precision-machined locking teeth configured to engage securely with grooves on the detachable bins; the electronic solenoid actuator operates in response to control signals from the central processing unit to selectively engage or release spring-loaded latch, allowing for automated bin replacement or removal during operation; a positional feedback sensor integrated into the bin locking mechanism provides real-time status updates on an engagement state of each latch, ensuring operational safety during material deposition or bin exchange; and the dynamic bin carousel is rotated by a servo-controlled motor system equipped with an angular encoder, said servo-controlled motor system aligning the designated bin with the robotic arms for material deposition as directed by the central processing unit.

15. The system of claim 1, wherein:

the foldable frame mechanism comprises:
- the hinged struts, each pivotally connected at joint assemblies to enable rotational movement, wherein the joint assemblies include integrated angular stops to limit a range of motion during folding and, the linear actuators being operatively connected to the hinged struts through pivot couplings, wherein the linear actuators:
  - drive a folding and unfolding motion by extending or retracting along a predefined axis;
  - include positional encoders that provide real-time feedback on a displacement of the linear actuators to the central processing unit;
- the bin locking mechanism is associated with the hinged struts, said bin locking mechanism comprising spring-loaded locking pins that automatically engage locking recesses upon the rigid central frame reaching its fully unfolded operational state, ensuring rigidity during operation; and an interconnection system comprising synchronization rods linking adjacent hinged struts;
- the synchronization rods translate the motion of one hinged strut to the others, enabling synchronized movement during folding and unfolding; and
- the central processing unit monitors a positional encoder feedback and dynamically adjusts motion of the actuator to achieve coordinated folding and unfolding of the rigid central frame, while the bin locking mechanism is disengaged based on signals from proximity sensors detecting a folded state of the rigid central frame.

16. The system of claim 1, wherein:

each of the omnidirectional wheels includes integrated roller mechanisms positioned radially around its circumference, each roller mounted on independent bearings to enable multi-directional movement without requiring wheel rotation, and each of the omnidirectional wheels comprises wheel hubs coupled with individual high-torque brushless DC motors, said torque brushless DC motors configured to independently control a rotational speed and direction of each of the omnidirectional wheels, allowing synchronized lateral and rotational movement in confined spaces;

torque sensors integrated within a motor housing continuously monitor traction forces, transmitting real-time feedback to the central processing unit to optimize movement of each of the omnidirectional wheels on varying surfaces;

each foldable axle is composed of interlocking tubular sections, the interlocking tubular sections connected by precision-engineered hinge joints that allow angular folding driven by servo-controlled actuators, the hinge joints include positional encoders and micro-locking pins that engage automatically during the folding or extension process, ensuring axial alignment and load stability;

a damping mechanism embedded within the hinge joints prevents sudden motion during the folding transition, reducing impact forces on adjacent components; and the triple-axis gyroscope is configured to detect tilt and angular displacement in real time.

17. The system of claim 1, wherein the control interface module utilizes pixel-level segmentation masks generated by an integrated Mask R-CNN to enhance the operation of robotic arms and adjustable gripper unit, the module comprising:

- a feature extraction subunit operatively connected to the sensor array module, wherein the feature extraction subunit employs a pre-trained convolutional neural network to process input images captured by hyperspectral imaging sensors and extract high-level object features;
- a Region Proposal Network (RPN) operatively linked with the central processing unit, wherein said RPN configured to identify regions of interest within the input images, wherein positional data from the segmentation masks is used to refine a trajectory of the robotic arms during waste collection; and
- a segmentation mask subunit integrated within the control interface module, wherein the feature extraction subunit generates binary masks of detected objects using pixel-level boundary data, and transmits this data to the central processing unit for real-time adjustments of the robotic arms and adjustable gripper unit during material handling.

* * * * *